US012584700B2

(12) United States Patent
Mason et al.

(10) Patent No.: US 12,584,700 B2
(45) Date of Patent: Mar. 24, 2026

(54) THERMAL BYPASS CONTROL VALVE FOR A COOLER LINE BLOCK WITH OFFSET CHANNELS FOR AN OUTFLOW LINE

(71) Applicant: SUPERIOR TRANSMISSION PARTS, INC., Tallahassee, FL (US)

(72) Inventors: Dean Mason, Tallahassee, FL (US); Victor Castano, Tallahassee, FL (US)

(73) Assignee: SUPERIOR TRANSMISSION PARTS, INC., Tallahassee, FL (US)

( * ) Notice: Subject to any disclaimer, the term of this patent is extended or adjusted under 35 U.S.C. 154(b) by 0 days.

(21) Appl. No.: 19/333,691

(22) Filed: Sep. 19, 2025

(65) Prior Publication Data

US 2026/0016244 A1     Jan. 15, 2026

Related U.S. Application Data

(63) Continuation-in-part of application No. 18/560,578, filed as application No. PCT/US2022/029480 on May 16, 2022.

(60) Provisional application No. 63/188,531, filed on May 14, 2021.

(51) Int. Cl.
| | |
|---|---|
| *F16K 11/04* | (2006.01) |
| *F16K 11/044* | (2006.01) |
| *F28F 27/02* | (2006.01) |
| *F16H 57/04* | (2010.01) |

(52) U.S. Cl.
CPC ............ *F28F 27/02* (2013.01); *F16K 11/044* (2013.01); *F16H 57/0413* (2013.01); *F16H 57/0435* (2013.01)

(58) Field of Classification Search
CPC .. F28F 27/02; F16H 57/0413; F16H 57/0435; F16K 11/044
See application file for complete search history.

(56) References Cited

U.S. PATENT DOCUMENTS

| | | | | |
|---|---|---|---|---|
| 3,300,135 A | * | 1/1967 | Slater | F16N 39/02 236/92 R |
| 2003/0136855 A1 | * | 7/2003 | Brown | G05D 23/1333 236/34.5 |

* cited by examiner

*Primary Examiner* — P. Macade Nichols
(74) *Attorney, Agent, or Firm* — DOWELL & DOWELL, P.C.

(57) ABSTRACT

A thermal control valve includes a plug, a valve seat apparatus, and a valve member positionable within a cooler line block with offset channels for an outflow line between a transmission and a transmission fluid cooler. The plug and valve seat apparatus are kept at a fixed positioned relative to each other by a first spring. A second spring is positionable within a connecting passage between the outflow line and an inflow line. The valve member is positioned between the second spring and the valve seat apparatus to move between a closed configuration to cool fluid, and a cooler bypass position to bypass the transmission fluid cooler when outflow line pressure becomes too high.

11 Claims, 16 Drawing Sheets

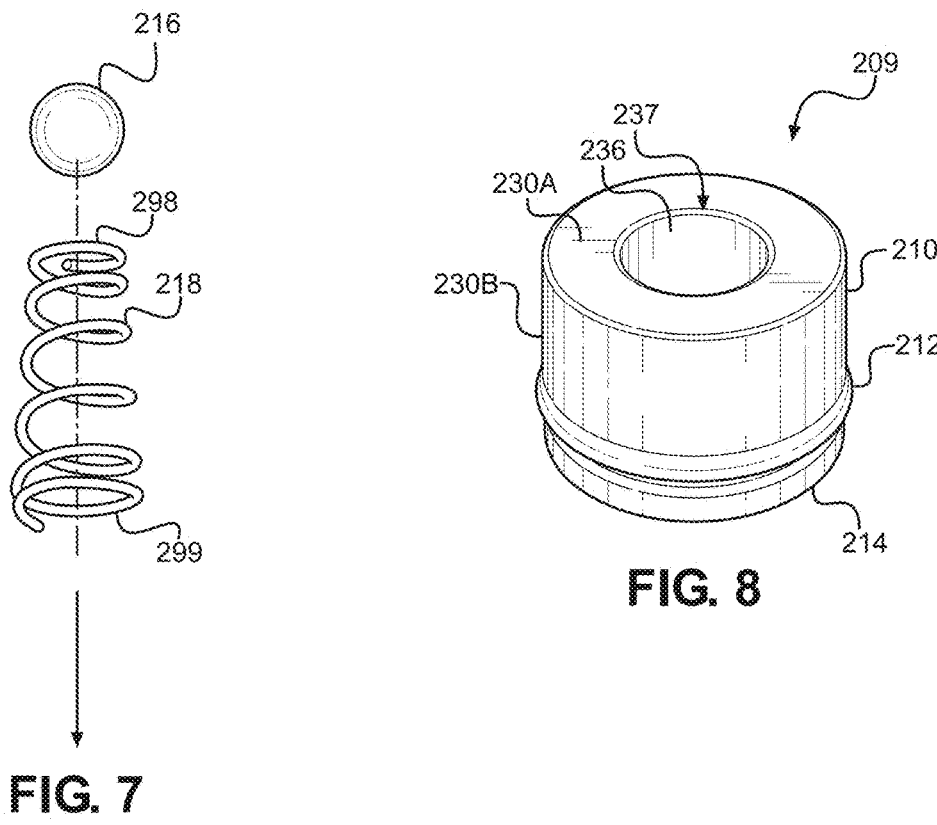
FIG. 7
FIG. 8
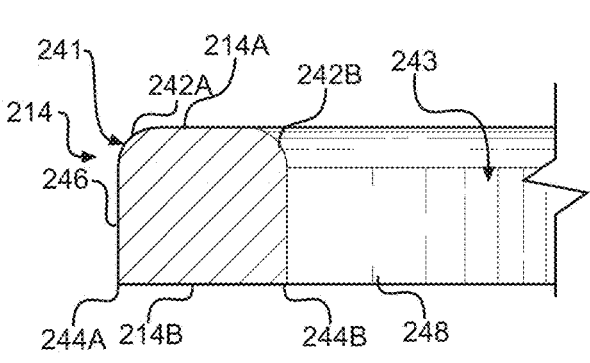
FIG. 9
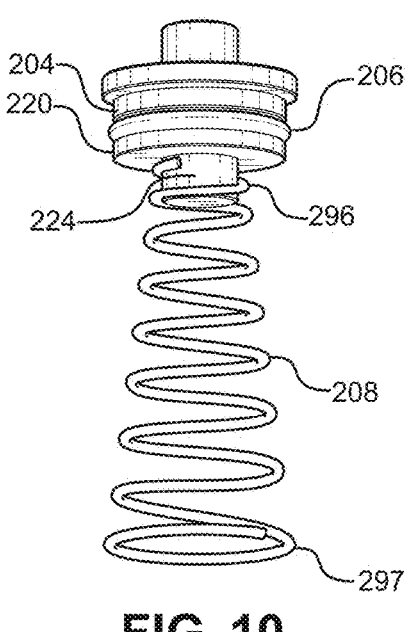
FIG. 10

FIG. 11A
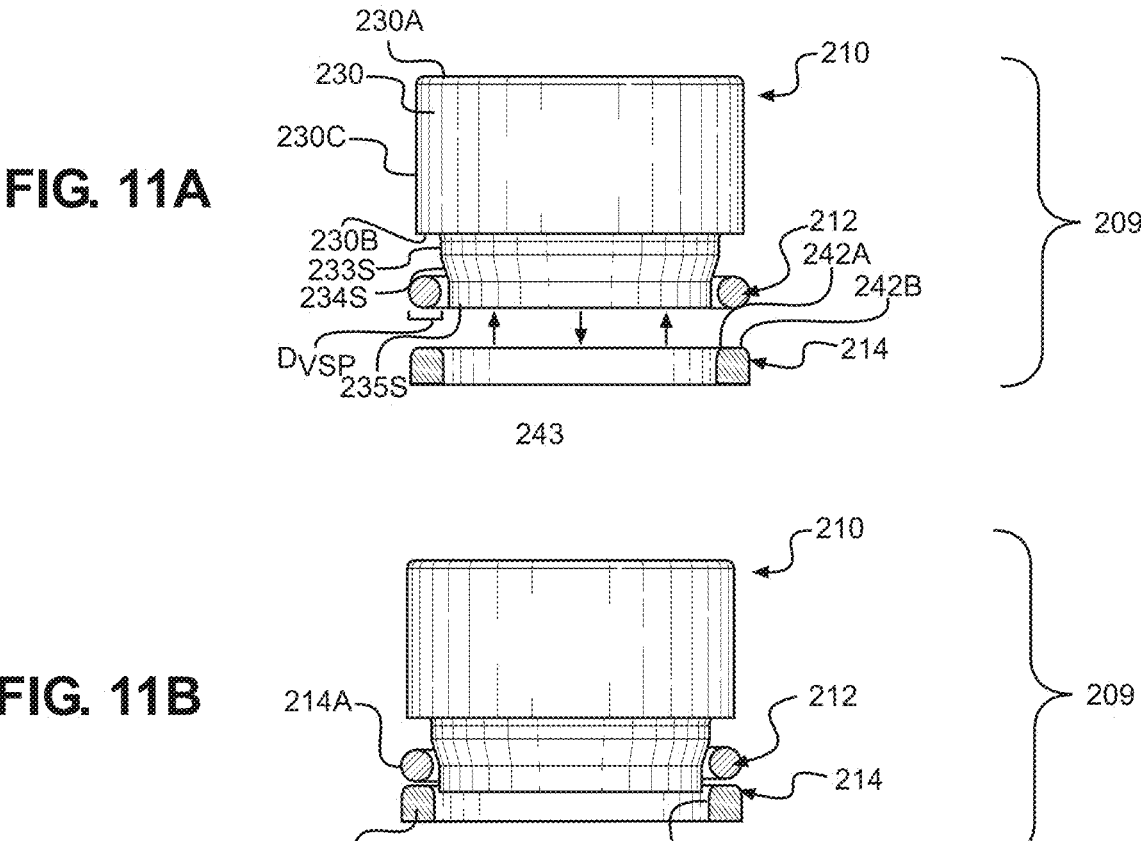
FIG. 11B
FIG. 11C
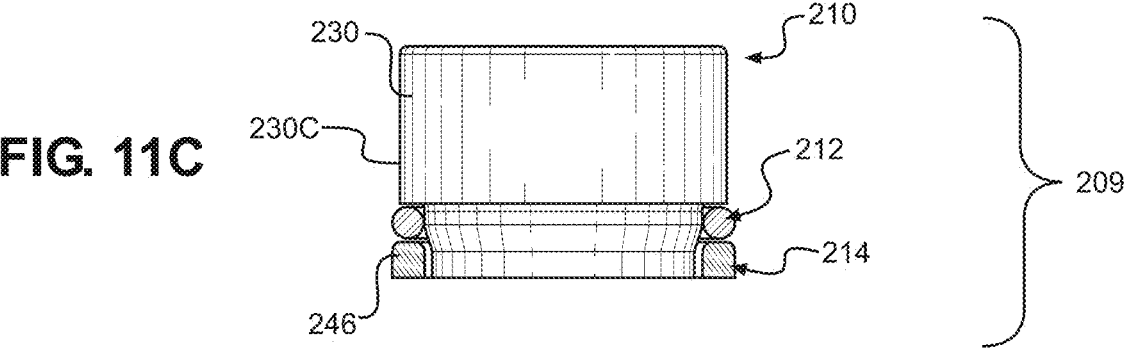

THERMAL BYPASS CONTROL VALVE FOR A COOLER LINE BLOCK WITH OFFSET CHANNELS FOR AN OUTFLOW LINE

CROSS-REFERENCE TO RELATED APPLICATIONS

The present invention is a continuation-in-part application that claim priority to U.S. national stage application Ser. No. 18/560,578, filed on Nov. 13, 2023, which is a national stage entry of international application no. PCT/US2022/029480, filed on May 16, 2022, which claims priority to U.S. provisional patent application No. 63/188,531, filed on May 14, 2021, the entirety of which is incorporated by reference.

STATEMENT REGARDING FEDERALLY SPONSORED RESEARCH

Not applicable.

PARTIES TO A JOINT RESEARCH AGREEMENT

Not applicable.

SEQUENCE LISTING

Not applicable.

STATEMENT REGARDING PRIOR DISCLOSURE

Not applicable.

BACKGROUND OF THE INVENTION

Field of the Invention

The present invention relates to a method for improving OEM (original equipment manufacturer) systems for supplying cooled fluid lubricant through an automotive transmission, and to replacement parts for effecting said improvements, namely, improved thermal control system valves replacing OEM valves in automotive transmissions in order to improve performance and reduce maintenance costs.

Brief Discussion of the Prior Art

Most heat in an automatic automobile transmission is generated in the torque converter (TC). Heat generation is relatively low during a lockup, or fluid coupling, phase, but during torque multiplication, and especially at maximum stall, high vortex flow forces fluid to make hard turns which generates a high level of fluid friction against internal component surfaces (for example, impeller, stator, and turbine). During sustained hard working conditions in the transmission, fluid temperatures can flash up to 300-400 degrees Fahrenheit (° F.), or 148.89-204.44 degrees Celsius (° C.). Thus, the most logical destination for liquid coolant, or fluid, flow is away from the torque converter through a converter OUT line, which is a line directly away from the torque converter to a transmission fluid cooler. Since the fluid returning from the fluid cooler is generally the coolest in the transmission, it is then ideal for that cooled fluid to flow through lubrication circuits (LUBE), where it lubricates and cools intermeshing gears, washers, bearings, and bushings under load. From there, the fluid drains into the sump where it is drawn through the sump filter by the pump, which supplies that line pressure from which converter feed is derived. Thus, the basic cycle for this portion of transmission function is: SUMP-FILTER-PUMP SUCTION-PUMP OUTPUT-LINE SUPPLY-TC FEED-TC OUT-COOLER-LUBE-back to SUMP. This strategy is typical and has been employed universally in all automatic transmissions for nearly a century with only a few rare exceptions.

In the same way a catalytic converter offers back pressure (i.e., resistance to flow) in an exhaust system, the transmission fluid cooler offers resistance in the fluid cooling system of the transmission, resulting in a pressure differential between the converter OUT line to the cooler (also referred to as an outflow line) as compared to a cooler return line to lubricate the transmission (also referred to as an inflow line). Two examples will suffice to illustrate this pressure differential. First, Honda 4 and 5 speed transmissions will typically flow 1.5 gallons per minute (GPM), or 9.46353e-5 cubic meters per second (m³/s) at 20-30 pressure per square inch (PSI), or 137.90-275.79 Kilopascal (kPa), on the outflow line, with about 6 PSI (41.37 kPa) in the inflow line. A Ford 5R110W transmission will flow 2-4 GPM (0.00012618-0.000252361 m³/s) at 20-40 PSI (137.90-275.79 kPa) through the outflow line, with 10-15 PSI (68.95-103.42 kPa) on the cooler inflow line. In this manner it is typical for most transmission cooler systems to maintain a 15-25 PSI (103.42-172.37 kPa) differential between outflow lines and inflow lines on either side of the cooler.

With an increased use of internal transmission computers, solenoids, sensors, pressure switches, and so forth, in modern automobiles, in combination with adaptive-learn and advanced shift control strategy programming, car manufactures have concluded that it is advantageous to warm the transmission fluid to an optimum operating temperature as quickly as possible, and thereafter maintain that controlled temperature throughout the drive cycle of the vehicle. The assumption is that if fluid temperature and viscosity are held constant, transmission functions can be controlled more consistently.

It has become quite fashionable in automotive engineering to employ the use of a thermostatic switch device to regulate flow through the transmission cooler. This "thermal element", as it is most commonly called, is placed somewhere in the thermal control system of the transmission where it can connect the outflow line and the inflow line circuits. In some cases it is utilized in coordination with a flow control valve. Sometimes the thermal element itself is designed as a compound part, and functions as a thermally expanding valve. Other times, the thermal element itself is the flow stop device without the aid of a valve. In all cases, whether secondary devices are employed or not, the fundamental principles do not change. Fluid temperature is thermostatically controlled in similar fashions.

The actual physical location of the thermostatic switch device, or thermal element, in principle can be anywhere these two circuits can be physically bridged. Further, the cooler, the outflow line, the inflow line, and thermostatic switch device together are often referred to as a thermal bypass system. To date, manufacturers have used five different locations for the thermal element:

TABLE 1

| LOCATION | EXAMPLE TRANSMISSION |
|---|---|
| 1. In Transmission Pump | Ford 5R110W |
| 2. In Transmission Valve | Ford 4/5R55E, 5R55W, |

TABLE 1-continued

| LOCATION | EXAMPLE TRANSMISSION |
| --- | --- |
| Body | 5R55N, 5R55S |
| 3. In Transmission Case Under Valve Body | Ford 6R80 |
| 4. In The Cooler | Dodge 68RFE, 545RFE |
| 5. In The Cooler Lines | GM 6L80 & 6L90; Allison 1000; Ford 4R75W, 6F35; Chrysler 42RLE, 45RFE, 545RFE, 68RFE; Jatco/Nissan JF011E (RE0F10A); Mercedes 722.6 |

Regardless of location, the purpose of the thermal element is identical, and in many cases the same exact physical part is used, and by different manufactures. For example, one thermal element has been used in Ford, GM, Dodge, and Mercedes transmissions.

There is however a difference in accessibility and/or serviceability between these different locations. In the case of location #1, the transmission must be removed to access the pump. Location #2 requires valve body removal and disassembly. Location #3 requires valve body removal. Locations #4 and #5 are more easily and more cost effectively serviced, since they are external to the transmission. Thus, as more vehicles begin to use thermal flow control, location #5 is quickly becoming the preferred site for thermal element placement.

The structural shape of the thermal element also necessarily varies between most locations, most notability between a thermal element in the pump (location #1), an element in the valve body (location #2), an element in the case (location #3), and an element in the cooler or cooler lines (locations #4 and #5). Between the different possible locations, only valves used in locations #4 and #5 are likely to have an identical or highly similar structure, as the thermal element in the cooler lines (#5) can be integrally formed with the cooler (#4). Otherwise, a valve in the pump, for example, is not interchangeable with a valve meant to be used in a thermal element located in the transmission case.

There are a variety of different housings used to contain the thermal element of the same location between transmission manufacturers, but for the most part these are size and shape alterations necessary to accommodate differently sized cooler lines and different mounting locations. The valves used between these different housing shapes and sizes would be structured similarly, as the internal method of controlling cooler flow would be similar.

There are three possible states for known thermal bypass systems:

1. Fully OPEN when cooler is bypassed;
2. Fully CLOSED when ALL the flow is forced through the cooler; and
3. The INTERMEDIATE or PARTIAL ON state.

When the thermal element is fully open, fluid flows out of the converter, drops down and loops through the lockup control valve, and comes back up to a split. One direction goes to the flow valve. The other direction goes to the out fitting (out at the transmission and in at the cooler). Under pressure, flow always follows the path of least resistance, so the fluid flow chooses the inflow line because the resistance in the cooler is much greater than that of the lube system. Pressure is transferred in both directions from the converter out circuit, but is equalized at the cooler return fitting, thus stopping cooler flow. Thus, in the OEM system, below a certain temperature, fluid flows in two directions and is stopped within the inflow line near the connection of the cooler to the inflow line. This system substantially prevents the flow of cooled fluid from the cooler to the transmission. This is otherwise known as cooler bypass.

When the thermal element in an OEM system is fully closed, flow is restricted to one direction. This occurs when the fluid temperature is above the desired operating temperature. The thermal element is expanded sufficiently, due to silicon or a similar expanding element in the valve, to completely close the valve and prevent cooler bypass in order to force all fluid flow through the cooler to bring temperature down.

When the thermal element is cold, the valve allowing fluid flow through the thermal element is in an open, default position. When the thermal element is over the thermal temperature limit, for example, 250° F. (121.11° C.), the valve is in a closed, bypass position. But, as the fluid begins to cool, the thermal element begins to contract and holds the valve in a midway flow metering position where the valve is just cracking open in the bore. This is the normal operating state, where the element functions to sustain a predetermined automatic transmission fluid (ATF) operating temperature, which is typically around 225-235° F. (107.22-112.78° C.). The thermal element holds the valve in a flow limiting position where part of the converter out flow goes through the cooler, and part of the flow bypasses through the thermal element directly to the transmission through the IN line. In this fashion, the fluid is partially cooled, and temperature is dynamically regulated. If ambient air temperature drops, and the cooler is more efficient, it bypasses more. If air temperature rises, it pushes more fluid through the cooler.

There are multiple issues with this system, however, including:

Overheating without setting diagnostic trouble codes as expected;

setting "phantom" codes as a result of erratic and inconsistent operation and/or temperature control;

silicon pack (in the thermal element valve) failure, leakage, and/or rupture with loss of fluid temperature control;

valves or other switching devices associated with the thermal element subject to sticking, which prevents proper and timely opening and closing of the thermal element;

cooler blocked and/or restricted with thermal system in cooler flow ON mode resulting in no cooler flow or lubrication, causing the planetary system to crash; and when the thermal control system gets stuck in bypass mode, and cooler flow never begins, fluid can heat to nearly 400° F. (204.44° C.; at this temperature, if supplied oxygen, the ATF becomes a fuel and will sustain a fire).

Even when the thermal control system has not malfunctioned, high fluid operating temperatures increase expansion of valve body castings resulting in reduced and/or insufficient valve clearance. This causes slowed valve response to switching signals, sluggish regulation, and valve sticking with even the slightest amount of particle or carbon powder contamination. The same behavioral characteristics are observed with solenoids, especially PWM-type solenoids. Higher temperatures make it more difficult for adaptive learn solenoids to remain stable. The solenoids tend to drift, in an effort to dial in control of functions, while being compromised by temperature induced mechanical obstructions in multiple areas.

An improved thermal bypass control valve is discussed in U.S. Pat. No. 9,249,875 to Mason. The valve of Mason is designed to operate as part of a thermal element in location #2, the valve body, which is the location of the thermal element in Ford® 5R55 series transmissions. While the valve of Mason would be applicable to other transmissions with the thermal element located in location #2, the valve of Mason would not be applicable to transmissions having thermal elements in locations #1, #3, #4, or #5. Thus, the improved thermal bypass control valve provided in Mason transmission cannot be applied to all other transmissions.

In view of the foregoing, there is a need for an improved process for supplying cooler to all automotive transmissions to avoid potential damage that may be caused to transmissions due to failure or faulty operation of thermal elements across various models of transmissions. There is a need to ensure constant flow of fluid through the cooling system. There is also a need to ensure immediate fill of the cooling system with accurate fluid levels without a warm-up cycle. Further, there is a need for thermal bypass valves that accomplish these improvements across transmissions having the thermal element located in the pump, in the case, or in the cooler or cooler lines.

The instant invention relates to a thermal bypass valve designed for a cooler block located along the inflow and outflow lines (#5 in Table 1). Specifically, the instant invention relates to a thermal bypass valve and method of replacing an OEM valve with the same in a cooler block. The cooler block may have an offset inflow line.

SUMMARY OF THE INVENTION

To resolve the issues present in OEM cooler flow valves, the instant invention provides for a preferred embodiment of a thermal bypass control valve insertable in a bore of a cooler line block with offset channels for an outflow line, the valve including:

a plug having a cylindrical body, a cylindrical cap portion, an outer member, and an inner member, the body having a plug ring groove along a circumference of the body, the cap portion positioned between the outer member and the body, the inner member extending from the body in an opposite direction relative to the outer member, wherein the body, the cap portion, the outer member, and the inner member are all coaxially arranged along a central plug axis;

a plug ring insertable within the plug ring groove, wherein a thickness of the plug ring partially extends beyond the cylindrical body of the plug when inserted within the plug ring groove;

a valve seat apparatus having a valve seat portion having a cylindrical valve seat body and an insertable element extending from an end of the valve seat body, the insertable element having a base portion and a neck portion, and a cavity extending within the valve seat portion between two oppositely-oriented openings, wherein the valve seat body, insertable element, and cavity are oriented coaxially along a valve seat axis, and the neck portion has a smaller diameter than the base portion, a valve seat ring insertable over the insertable portion of the valve seat portion, and a cylindrical spacer slidable over the neck portion of the insertable portion;

a stabilizing spring configured to be positionable between the plug and the valve seat apparatus to secure the valve seat apparatus in a fixed position within the bore;

a valve member, and a valve spring, the valve member spring securable at a base end against a bottom of the bore and against the valve member at a valve spring end, wherein the valve spring secures the valve member against a surface of cavity in a closed configuration, and the valve spring compresses to move the valve member away from the surface of the cavity in an open configuration.

Another embodiment of the thermal bypass control valve is taught, wherein the stabilizing spring further comprises a base end and a receiving end, the receiving end having a smaller diameter than the base end, and wherein the inner member is insertable within the smaller diameter of the receiving end and the based end is securable against an upper surface of the ball seat body.

Another embodiment of the thermal bypass control valve is taught, wherein the cavity of the ball seat portion includes a cylindrical cavity portion 236 and a frusto-conical cavity portion 238.

Another embodiment of the thermal bypass control valve is taught, wherein the ball contacts the frusto-conical cavity portion in the closed configuration.

Another embodiment of the thermal bypass control valve is taught, wherein the plug ring and ball seat ring are elastically deformable and provide a friction coefficient to secure to the plug and ball seat portion within the bore.

Another embodiment of the thermal bypass control valve is taught, wherein the cylindrical spacer has a squared edge along a bottom inner edge and a bottom outer edge 244a, and has a curved edge along a top inner edge and a top outer edge.

Another embodiment of the thermal bypass control valve is taught, wherein the ball seat ring is positioned with the top inner edge and top outer edge oriented toward the ball seat body.

Another embodiment of the thermal bypass control valve is taught, wherein the stabilizing spring extends within the bore between the offset channels for the outflow line.

Another embodiment of the thermal bypass control valve is taught, wherein the ball seat apparatus is positioned within the bore such that it does not reduce an opening of a first offset channel of the outflow line.

Another embodiment of the thermal bypass control valve is taught, wherein the plug is positioned within the bore such that it does not reduce an opening of a second offset channel of the outflow line.

An embodiment of a method for improving fluid flow through a transmission thermal control system is taught, including:

a) removing an original equipment manufacturer (OEM) thermal bypass control valve from the bore of the cooler line block with offset channels; and b) inserting the cooler fluid control valve of claim 1 into the bore of the cooler line block.

A further embodiment of the method is taught, wherein the bore includes an upper portion and a lower portion, the lower portion having a smaller diameter than the upper portion.

A further embodiment of the method is taught, further including using a modified ball seat ring with a thicker diameter to compensate for the smaller diameter of the lower portion of the bore.

A further embodiment of the method is taught, furthering including, before step b), inserting the ball seat ring over the neck portion, inserting the spacer in the bore, inserting the ball seat portion with the ball seat ring over the neck portion into the bore, and forcing the ball seat ring around the base portion by pressing the neck portion within an inner circumference of the spacer.

Another embodiment of the thermal bypass control valve includes:

a plug having a cylindrical body, a cylindrical cap portion, an outer member, and an inner member, the body having a plug ring groove along a circumference of the body, the cap portion positioned between the outer member and the body, the inner member extending from the body in an opposite direction relative to the outer member, wherein the body, the cap portion, the outer member, and the inner member are all coaxially arranged along a central plug axis;

a plug ring insertable within the plug ring groove, wherein a thickness of the plug ring partially extends beyond the cylindrical body of the plug when inserted within the plug ring groove;

a valve seat apparatus having a valve seat portion having a cylindrical valve seat body and an insertable element extending from an end of the valve seat body, the insertable element having a base portion and a neck portion, and a cavity extending within the valve seat portion between two oppositely-oriented openings, wherein the valve seat body, insertable element, and cavity are oriented coaxially along a valve seat axis, and the neck portion has a smaller diameter than the base portion, a valve seat ring insertable over the insertable portion of the valve seat portion, and a cylindrical spacer slidable over the neck portion of the insertable portion;

a cap having a central opening and a plurality of openings, the plurality of openings arranged around the central opening;

a stabilizing spring configured to be positionable between the plug and the cap to secure the cap and the valve seat portion in a fixed position within the bore;

a valve member, and a valve spring, the valve member spring securable between the plug and the valve member, wherein the valve spring extends through the central opening of the cap and movably secures the valve member against a surface of the cavity in a closed configuration, and the valve spring compresses to move the valve member away from the surface of the cavity in an open configuration.

Another embodiment of the thermal bypass control valve includes:

a plug having a cylindrical body, a cylindrical cap portion, an outer member, and an inner member, the body having a plug ring groove along a circumference of the body, the cap portion positioned between the outer member and the body, the inner member extending from the body in an opposite direction relative to the outer member, wherein the body, the cap portion, the outer member, and the inner member are all coaxially arranged along a central plug axis;

a plug ring insertable within the plug ring groove, wherein a thickness of the plug ring partially extends beyond the cylindrical body of the plug when inserted within the plug ring groove;

a valve seat apparatus having a valve seat portion having a cylindrical valve seat body and an insertable element extending from an end of the valve seat body, the insertable element having a base portion and a neck portion, and a cavity extending within the valve seat portion between two oppositely-oriented openings, wherein the valve seat body, insertable element, and cavity are oriented coaxially along a valve seat axis, and the neck portion has a smaller diameter than the base portion, a valve spring seat apparatus having a valve spring seat portion having a cylindrical spring seat body comprising a base portion and an inset portion, the inset portion having a smaller diameter than the base portion, a plurality of openings arranged perpendicular to the spring seat body, and a cavity comprising a receiving element from an end of the spring seat body, and a two cylindrical surfaces extending within the spring seat portion between two oppositely oriented openings, wherein the spring seat body receiving element and cylindrical surfaces are arranged coaxially along a spring seat axis, and the receiving portion has a smaller diameter than the base portion slidable over the neck portion of the valve seat insertable portion;

a stabilizing spring configured to be positionable between the plug and the valve spring seat to secure the cap, the valve spring seat and the valve seat portion in a fixed position within the bore;

a valve member, and a valve spring, the valve spring securable between the valve spring seat and the valve member, wherein the valve spring extends between the valve spring seat and the valve member and movably secures the valve member against a surface of the cavity in a closed configuration, and the valve spring compresses to move the valve member away from the surface of the cavity in an open configuration.

A better understanding of the invention and its embodiments will be had with reference to the drawings, described herein.

BRIEF DESCRIPTION OF THE SEVERAL VIEWS OF THE DRAWINGS

The invention will be better understood with reference to the following figures illustrating the embodiments of the invention:

FIG. 7 is an exploded view of a valve member and valve spring of the thermal bypass control valve embodiment of FIG. 3;

FIG. 8 is a perspective view of a valve seat apparatus of the thermal bypass control valve embodiment of FIG. 3;

FIG. 9 is a cross-sectional view of a portion of a spacer of the thermal bypass control valve embodiment of FIG. 3;

FIG. 10 is a perspective view of the plug, a plug ring, and stabilizing spring of the thermal bypass control valve embodiment of FIG. 3 operationally secured together;

FIG. 11A is a cross-sectional view of a valve seat portion, a valve seat ring, and a spacer before the spacer is secured to the valve seat portion;

FIG. 11B is a cross-sectional view of the valve seat portion, the valve seat ring, and the spacer of FIG. 11A, with the spacer pushing the valve seat ring along a transitional surface of the valve seat portion;

FIG. 11C is a cross-sectional view of the valve seat portion, the valve seat ring, and the spacer of FIG. 11B, with the spacer secured around a neck portion of the valve seat portion and the valve seat ring secured around a base portion of the valve seat portion;

DETAILED DESCRIPTION OF THE INVENTION

Figure 1:
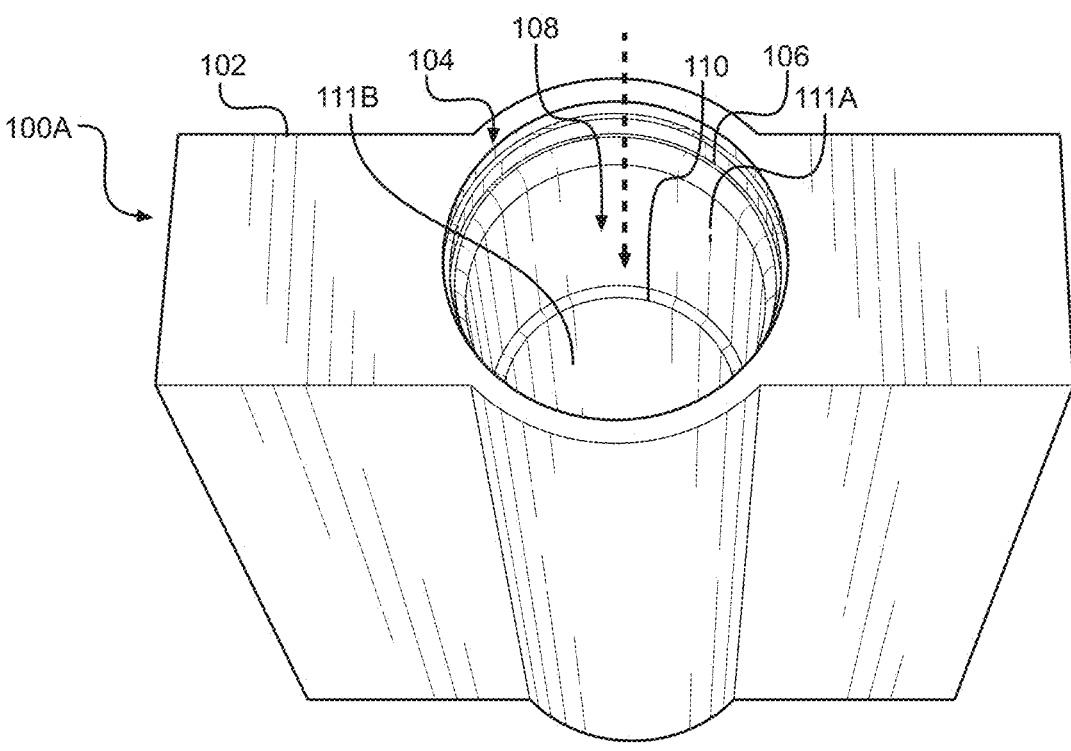
FIG. 1 is a perspective view of a cooler line block with a bore having a reduced bore diameter.
Figure 2:
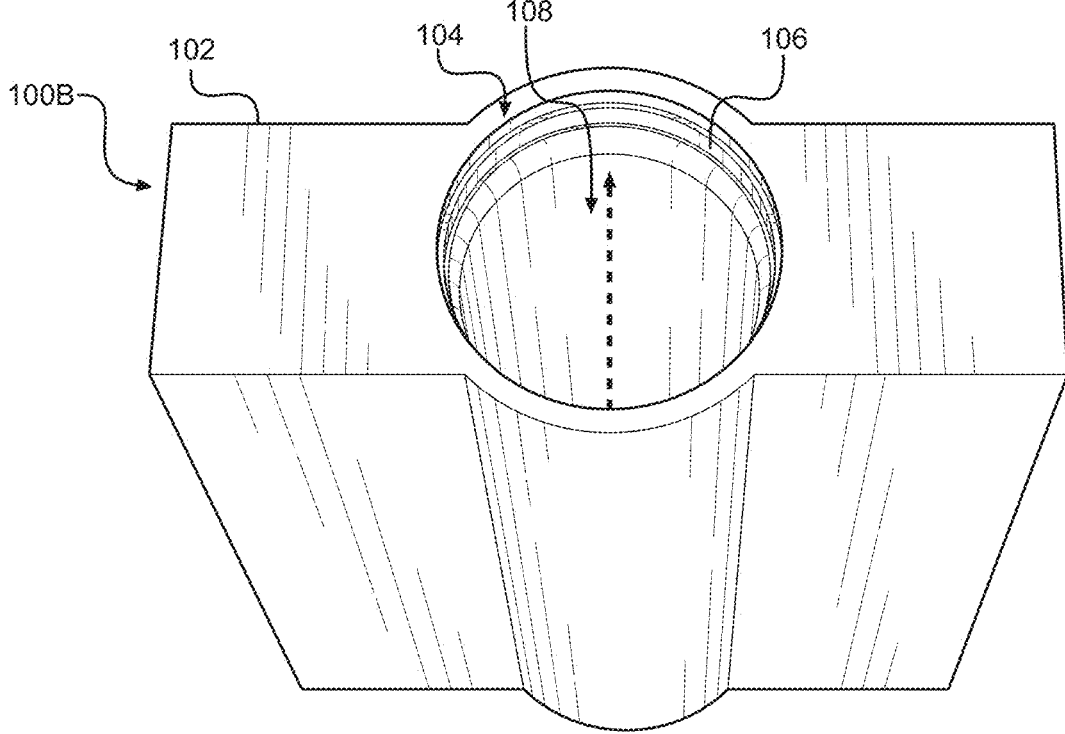
FIG. 2 is a perspective view of a cooler line block with a bore having a constant bore diameter.

FIGS. 1 and 2 illustrate two types of representative cooler line blocks 100A and 1001B, respectively, found in automatic automotive transmissions. Cooler line blocks are metal housings having a body 102 that is connected on two or more sides to each of an inflow line and an outflow line. From one side of the cooler line block, the outflow line delivers fluid from the transmission to the cooler line block, and fluid flows from the cooler line block to the cooler through the outflow line on another side of the cooler line block. An inflow line between the cooler line block and the cooler transports fluid from the cooler to the cooler line block, and the inflow line between the transmission and cooler line block transports fluid from the cooler line block to the transmission. Transmission cooler outflow openings 116A and 116B and inflow openings 118A and 118B in the cooler line blocks 100A, 100B are shown in FIGS. 4A, 4B, 12 and 13. Outflow and inflow openings 116A and 118B correspond to respective outflow and inflow lines between the cooler line block 100A, 100B and the transmission, not shown, while outflow and inflow openings 116B and 118B correspond to respective inflow and outflow lines between the cooler line block and the cooler.

Both examples of the cooler line block 100A and 100B have a bore 108 extending from an opening 104 into the body 102. The bore 108 is oriented perpendicularly to the outflow openings 116A, 116B and inflow openings 118A, 118B. However, there is a lip 110 in the bore 108 of the cooler line block 100a. The lip 110 demarks two different diameters within the bore 108 of cooler line block 100A. A larger diameter section 111A of the bore 108 extends above the lip 110 and beneath one or more grooves 106 for accepting a cap and/or clip to secure a valve. A smaller diameter section 111B of the bore 108 extends below the lip 110 towards a bottom 113 of the bore. In the bore 108 of the cooler line block 1001B, there is no lip and a diameter D of the bore is consistent along a length L of the bore.

The outflow openings 116A and 116B are offset in both cooler line blocks 100A and 1001B, such that the outflow openings do not share a common central axis $A_{OF}$. The inflow openings 118A and 118B are preferably coaxial, and are not typically offset.

A bypass channel 115 extends from the bottom 113 of the bore 108 of each cooler line block 100a, 100b to the bypass opening 117, which fluidly connects the bypass channel and bore to the inflow line 118. Absent the presence of a valve or other structure beyond the cooler line block 100a, 100b, the inflow line 118 in the cooler block body 102 is open to the outflow line 116 through the bypass channel 115, opening 117, and bore 108. Any valve inserted into the bore 108 at least regulates fluid flow through the bypass opening 117 to either allow, limit, or prevent fluid flow to the cooler.

As previously described, the OEM valve for the cooler line block 100a, 100b is defaulted, or under a certain temperature threshold, to a position where the outflow line 116 and inflow line 118 are fluidly connected in the cooler line block. In other words, fluid passes through opening 116A, into the bore 118, through the bypass channel 115, through the opening 117, into the inflow channel, and out through the inflow opening 118A to travel back to the transmission. The OEM valve is therefore defaulted to bypassing fluid flow to the cooler. Over that certain temperature threshold, the OEM valve closes the fluid connection through the opening, or between outflow line 116 and inflow line 118. Fluid is then forced through opening 116A, through the bore 108, out opening 116A to the cooler, back into opening 118B, out opening 118A, and into the transmission.

The OEM valve can also have a partial-on state, where the OEM valve allows some fluid through the opening 117 to bypass the cooler, and some fluid to travel to the cooler and back to the transmission.

Figure 3:
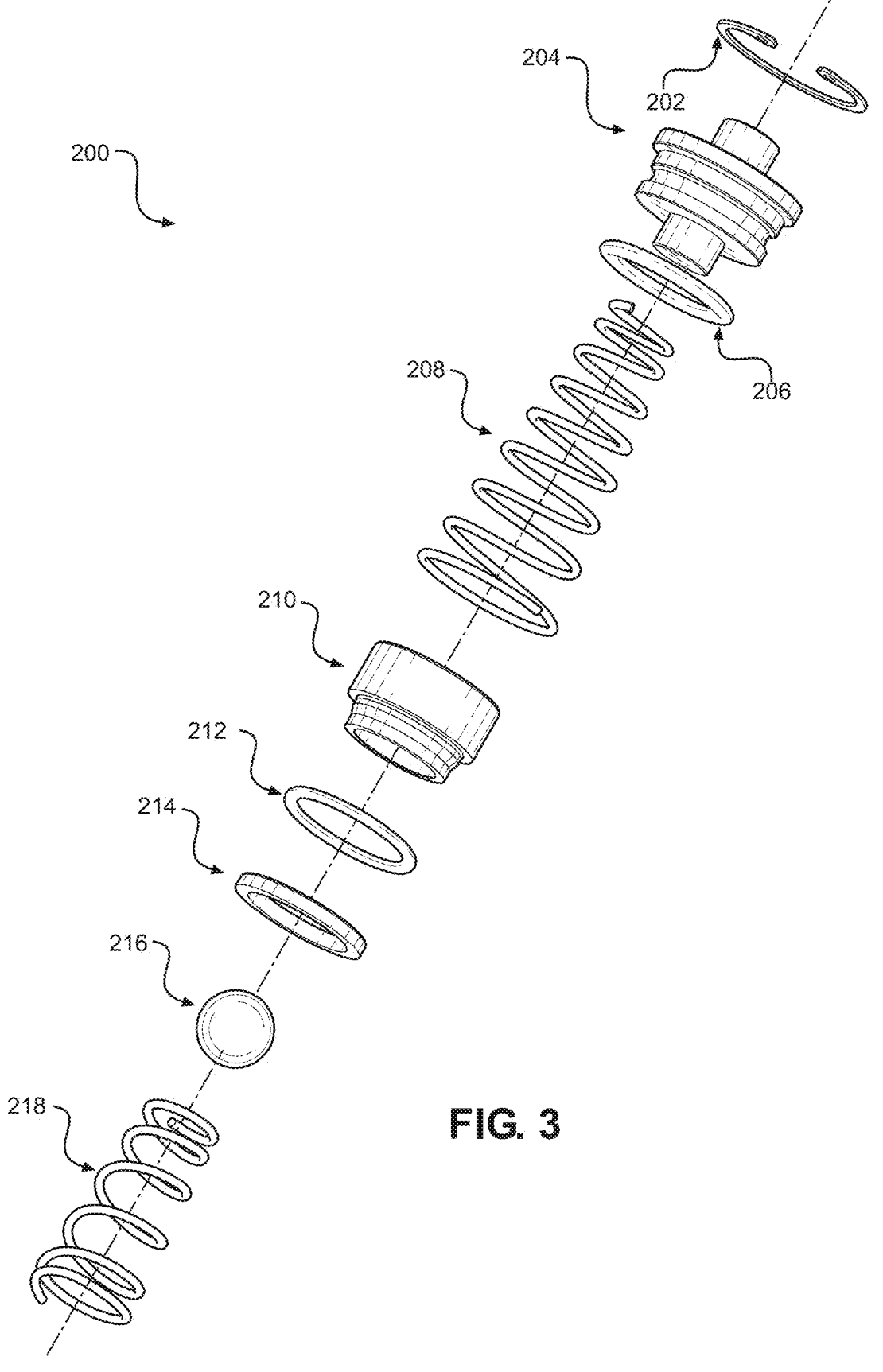
FIG. 3 is an exploded view of a cooler fluid control valve embodiment of the present invention.

FIG. 3 illustrates a preferred embodiment of a thermal bypass control valve 200 insertable in the bore 108 of a cooler line block 100a or 100b with offset openings 116A, 116B for an outflow line. The valve 200 includes a clip 202 insertable in one of the grooves 106 of the cooler line block 100a, 100b to secure a plug 204 within the opening 104. In some embodiments, the clip 202 may be the OEM clip that is reusable with the remaining new parts, i.e. not OEM parts, of the valve 200. The plug 204 closes the opening 104 so that fluid cannot escape the bore 108 through the opening once the valve 200 is properly secured within the bore. A plug ring 206 assists in closing the opening 104 by providing a seal against the bore 108, and between the bore and the plug 204. The plug ring 206 also helps to secure the plug 204 in the opening 104 by providing resistance through friction and compression of the ring between the plug and the bore 108. A valve seat apparatus 209 sits within the bore 108 along the bottom 103, and includes a valve seat portion 210, a valve seat ring 212, and a spacer 214. The valve seat ring 212 helps to secure the valve seat apparatus in the bore 108 by providing resistance through friction and compression of the ring between the valve seat portion 210 and the bore. A stabilizing spring 208 extends along a partial length of the bore 108 and between the plug 204 and the valve seat 210 to hold the valve seat apparatus against the bottom 113 of the bore 108. A valve member 216 and a valve member spring 218 are positioned on an opposite side of the valve seat apparatus 209 to the stabilizing spring 208. The valve member spring 218 preferably extends within the bypass opening 115 and movably secures the valve member 216 between the valve spring and valve seat apparatus 209.

Figures 4A, 4B:
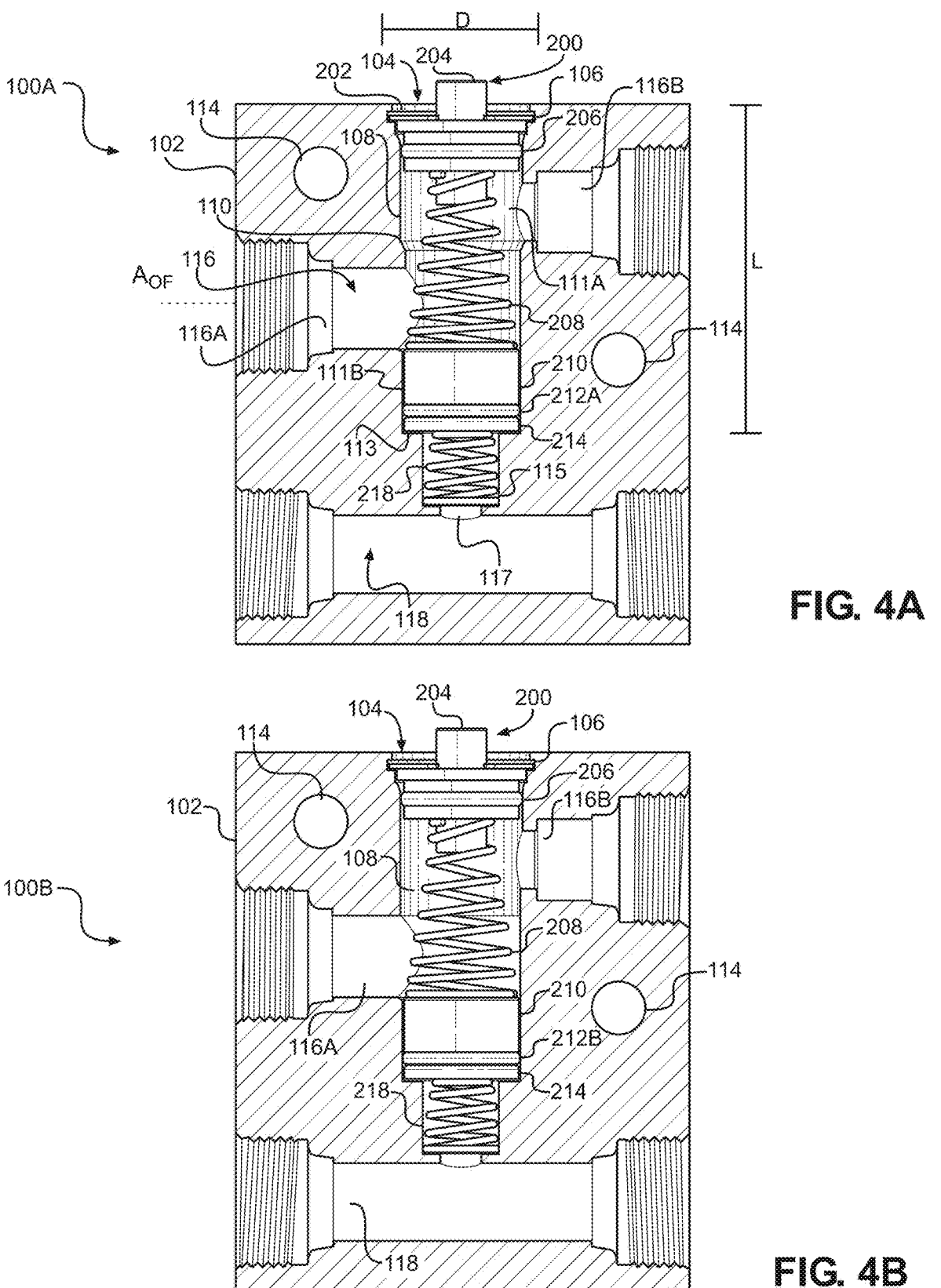
FIG. 4A is cross-sectional view of the cooler line block of FIG. 1, with a thermal bypass control valve embodiment inserted within a bore of the cooler line block to replace an OEM fluid control valve.
FIG. 4B is cross-sectional view of the cooler line block of FIG. 2, with a thermal bypass control valve embodiment inserted within a bore of the cooler line block to replace an OEM thermal bypass control valve.

FIGS. 4A and 4B show the thermal control system valve 200 installed in a cooler line block 100A and 100B, respectively. FIG. 4A shows the lip 110 of cooler line block 110A, which is not present in the cooler line block 100B. In both cooler line blocks 100A and 100B, the same components of the thermal control system valve 200 are used, with the exception of the valve seat ring 212. With the cooler line block 100A, a valve seat ring 212A is used. With the cooler line block 100B, a valve seat ring 212B is used. The valve seat ring 212A has a smaller diameter than valve seat ring 212B to compensate for the smaller diameter of the lower portion 111B of the bore 108 in block 100A.

In cooler line block 100A, which includes the lip 110, the upper portion 111A of the bore 108 has a diameter of 0.687 inches ("), or 17.449 millimeters (mm), and the lower portion 111B of the bore has a diameter of 0.657" (16.687 mm). In cooler line block 1001B, which does not include the lip 110, the bore 108 has a diameter of 0.687" (17.449 mm) along the entire length of the bore. The valve seat ring 212B is thicker in diameter and has a larger outer circumference than the valve seat ring 212A to properly secure the valve seat apparatus 209 within the bore 108 of cooler line block 100B.

Figure 5:
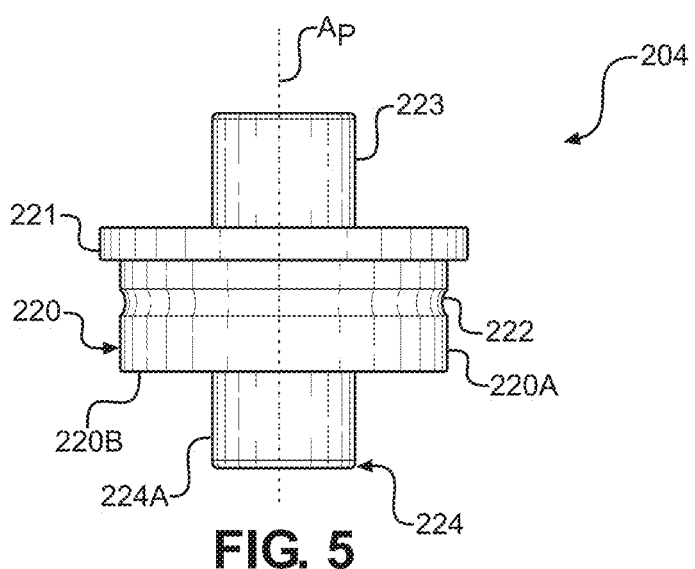
FIG. 5 is a side view of a plug of the thermal bypass control valve embodiment of FIG. 3.

The plug 204, as shown in FIG. 5, has a cylindrical body 220 that fits coaxially through the opening 104 and is insertable along a length of the cylindrical body into the bore 108. The plug 204 also includes a cylindrical cap portion 221, an outer member 223, and an inner member 224. The inner member 224 has an outer surface 224A that is engageable with the stabilizing spring 208. The cap portion 221 is cylindrical and positioned between the outer member 223 and the body 220. The cap portion 221 is coaxial with the body 220, and has a greater diameter than the body. The cap portion 221, when the valve 200 is secured within the cooler line body 100a, 100b, acts to help close the opening 104 to prevent fluid from escaping through the opening. The inner member 224 extends from the body 220 in an opposite direction relative to the outer member, which extends from the cap portion 221. The body 220, the cap portion 221, the outer member 223, and the inner member 224 are all preferably coaxially arranged along a central plug axis $A_P$. A plug ring groove 222 extends along a circumference of an outer surface 220a of the body 220. The plug ring groove 222 is shaped to accept the plug ring 206.

Preferred dimensions of the plug 204 will be described next, with length dimensions being oriented along, or parallel to, the same axis $A_P$ and the diameter or width dimensions oriented perpendicularly to the axis $A_P$. The outer member 223 preferably has a length of 0.230" (5.842 mm) and a diameter of 0.300" (7.620 mm). The cap portion 221 preferably has a length of 0.066" (1.676 mm) and a diameter of 0.770" (19.558 mm). The body 220 preferably has a length of 0.160" (4.064 mm) and a diameter of 0.678" plus or minus (+/−) 0.001" (17.221 mm+/−0.025 mm). The groove 222 preferably has a length of 0.078" (1.981 mm) and a diameter of 0.587"+/−0.001" (14.910 mm+/−0.025 mm). The inner member preferably has a length of 0.150" (3.810 mm) and a diameter of 0.265" (6.731 mm).

The plug ring 206 is insertable within the plug ring groove 222, such that a portion of the thickness of the plug ring extends beyond the plug ring groove and the body 220 of the plug 204 when positioned within the plug ring groove. When the valve 200 is inserted into the bore 108, the plug ring 206 is secured between the bore and the plug 204, while positioned within the plug ring groove 222. In this position, the plug ring 206 creates an additional seal to help prevent leakage of the pressurized fluid within the cooler line block 100a, 100b, along with the cap portion 221.

Figure 6A:
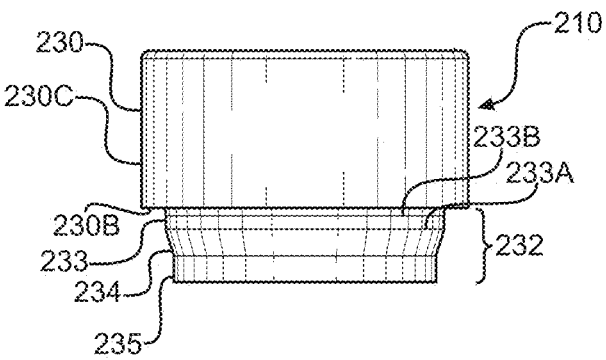
FIG. 6A is a side view of a valve seat portion of the thermal bypass control valve embodiment of FIG. 3.
Figure 6B:
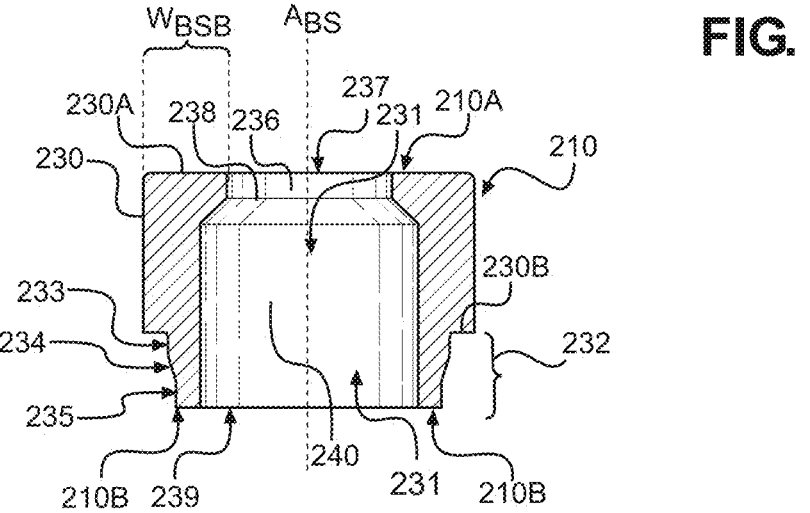
FIG. 6B is a cross-sectional view of the valve seat portion of FIG. 6A.

FIGS. 6A and 6B illustrate the valve seat portion 210, which is assembled with the valve ring 212 and spacer 214 to form the valve seat apparatus 209. The valve seat portion 210 includes a cylindrical valve seat body 230 and an insertable element 232, which extends from a bottom surface 230B of the valve seat body. A top surface 230A of the valve seat body 230 has a width $W_{bsb}$ to accommodate a wide end 297 of the stabilizing spring 208 when the valve 200 is positioned within the bore 108. Preferably, the width $W_{bsb}$ is 0.164"+/−0.0005" (4.166 mm+/−0.013 mm).

The insertable element 232 has a base portion 233 adjacent to and extending from the bottom surface 230B. Preferably, at least a partial length of the base portion 233 extends perpendicularly from the bottom end 230b, although the base portion may extend at an angle off 90 degrees relative to the base portion in other embodiments. The base portion 233 may include both an angled surface 233B and a parallel surface 233A, relative to a central valve seat axis ABS, such that the angled surface is adjacent to the bottom surface 230B and the parallel surface extends from the angled surface.

A neck portion 235 is connected to the base portion 233 by a transition portion 234. The neck portion 235 has an overall diameter that is less than an overall diameter of the parallel surface 233A of the base portion 233. The neck portion 235 is preferably perpendicularly oriented relative to the bottom surface 230b of the valve seat body, and is adjacent to a bottom surface 210B of the valve seat portion 210. The transition portion 234 has an overall diameter that changes along its length, and decreases in diameter from the base portion 233 to the neck portion 235.

A channel 231 runs centrally through the valve seat portion 210 and is open at openings 237 and 239 along the top surface 210A and the bottom surface 210B of the valve seat portion 210, respectively. The channel 231 includes a first cylindrical surface 236, a frusto-conical surface 238, and a second cylindrical surface 240. The cylindrical surface 236 extends from the opening 237 along a partial length of the valve seat portion 210 to adjacent to the frusto-conical surface 238. The frusto-conical surface 238 extends between and adjacent to the first cylindrical surface 236 and the second cylindrical surface 240, which extends from the opening 239 along a partial length of the valve seat portion 210 to adjacent to the frusto-conical surface 238. The cylindrical surface 236 and the frusto-conical surface 238 meet along a shared edge within the channel 231. A diameter of the first cylindrical surface 236 is smaller than the valve member 216 such that the valve member cannot pass through the channel 231 along the first cylindrical surface. A diameter of the frusto-conical surface 238 changes along its length, and likewise, at least along a partial length, has a smaller diameter than the valve member 216. From the opening 239, the second cylindrical surface 240 has a large enough diameter to accept at least a portion of the valve member 216, such that the valve member is capable of blocking fluid flow through the channel 231. This may mean that the valve member 216 is sized to block fluid flow through a portion of the channel including only the first cylindrical surface, the frusto-conical surface 238, and/or the second cylindrical surface 240.

Preferred dimensions of the valve seat portion 210 will be described next, with length dimensions being oriented along, or parallel to, the valve seat axis ABS and the diameter or width dimensions oriented perpendicularly to the valve seat axis ABS. The body 230 preferably has a length of 0.300" (7.620 mm) and a diameter of 0.648"+/−0.001" (16.459 mm+/−0.025 mm). The base portion 233 preferably has a length of 0.050" (1.270 mm) and a diameter of 0.556"+/−0.001" (14.122 mm+/−0.025 mm). The transition portion 234 preferably has a length of 0.050" (1.270 mm) and a diameter that changes from 0.556"+/−0.001" (14.122 mm+/−0.025 mm) to 0.523"+/−0.001 (13.284 mm+/−0.025 mm). The neck portion 235 preferably has a length of 0.050" (1.270 mm) and a diameter of 0.523"+/−0.001" (13.284 mm+/−0.025 mm). The cavity 231 has a total length of 0.450" (11.430 mm). The first cylindrical surface 236 has a length of 0.070" (1.778 mm) and a diameter of 0.320" (8.128 mm). The second cylindrical surface 240 has a length of 0.350" (8.890 mm) and a diameter of 0.421" (10.693 mm). The frusto-conical surface 238 has a length of 0.030" (0.762 mm) and changes diameter from 0.320" (8.128 mm) to 0.421" (10.693 mm).

The valve seat body 230, insertable element 232, and cavity 231 are preferably oriented coaxially along the valve seat axis ABS, along with their respective substructures, such as the first cylindrical surface 236, the frusto-conical surface 238, the second cylindrical surface 240, the base portion 233, transition portion 234, and the neck portion 235.

The valve seat ring 212 is securably slidable over the insertable portion 232 of the valve seat portion 210, including the base portion 233, transition portion 234, and the neck portion 235. The valve seat ring 212 is preferably flexible and/or expandable to initially be secured around the neck portion 235, then slidably engaged over the transition portion 234, and then slidably engaged over the base portion 233. The valve seat ring 212 provides a friction coefficient to help secure the valve seat apparatus 209 in the bore 108.

FIG. 9 illustrates half of the cylindrical spacer 214 along a cross-section taken through a central lateral axis. The remaining view of the spacer 214 along the cross-section would mirror the portion shown in FIG. 9. The spacer 214 includes a body 241 with an outer circumferential surface 246 and an inner circumferential surface 248. An upper surface 214A of the body 241 includes edges, preferably two rounded edges 242A and 242B. A bottom surface 214B of the body 241 includes edges, preferably two square edges 244A and 244B. The outer circumferential surface 246 and the inner circumferential surface 248 are oppositely oriented to each other, but both adjacent to the upper surface 214A and the bottom surface 214B. The spacer body 241 is therefore preferably rectangular along the cross-section, with the exception of the two rounded edges 242A and 242B. An overall diameter of the spacer 214, or diameter of the outer circumferential surface 246 is preferably similar to the diameter of the valve seat body 230. The diameter of the outer circumferential surface 246 is preferably between 0.651"-0.655" (16.535 mm-16.637 mm). An inner diameter of the spacer 214, measured between opposite sides of the inner circumferential surface 248, preferably matches, or is slightly larger than, the diameter of the neck portion 235. The diameter of the outer circumferential surface 246 is preferably between 0.536"-0.540" (13.614 mm-13.716 mm). The neck portion 235 is slidably engageable within an opening 243 of the spacer 214, the opening being defined by the inner circumferential surface 248. A length of the spacer 214 is preferably 0.075"-0.080" (1.905 mm-2.032 mm).

FIG. 8 shows the valve seat apparatus 209 in its final configuration after installation of the valve 200 in the bore 108. The valve seat ring 212 is positioned around the base portion 233 of the insertable element 232. The neck portion 235 is insert in the opening 243 with the spacer 214 positioned around the neck portion. The valve seat ring 212 partially extends beyond a circumferential surface 230C of the body 230 and the outer circumferential surface 246.

FIGS. 11A, 11B, and 11C show assembly of the valve seat apparatus 209 during valve 200 installation in the bore 108 along a similar cross-section of the valve seat portion 210, valve seat ring 212, and spacer 214.

In FIG. 11A, the valve seat ring 212 is positioned around an outer circumferential surface 235S of the neck portion 235 of the insertable element 232. The spacer 214 is oriented such that upper surface 214A and rounded edges 242A and 242B are facing the valve seat portion 210. The spacer 214 and valve seat portion 210 are further oriented such that the neck portion 235, and/or the insertable element 232, is coaxial with the opening 243 of the spacer 214, which are also preferably coaxial, to align the neck portion with the opening 243.

In FIG. 11B, the neck portion 235 of the insertable element 232 is partially inserted into the opening 243 such that the outer circumferential surface 235S slidably engages the inner circumferential surface 248 of the spacer 214 along a partial length. In turn, this pushes or slides the valve seat ring 212 to a position along the outer circumferential surface 234S of the transitional portion 234. Importantly, no portion of a thickness of the valve seat ring 212 extends beyond the valve seat portion 210 or the spacer 214. In other words, the spacer 214 and/or the valve seat portion 210 have the larger overall diameters in this configuration than the valve seat ring 212. While the spacer 214 is attached to the valve seat portion 210, the valve seat apparatus 209 is not yet in a final functional configuration. This configuration, an installable configuration, allows the valve seat apparatus 209 to be inserted within the bore 108 such that the bottom surface 214b of the spacer 214 contacts against the bottom 113 of the bore.

In FIG. 11C, once the valve seat apparatus configuration of FIG. 11B is inserted in the bore 108 such that the bottom surface 214b of the spacer 214 lays flat against the bottom 113, the insertable element 232 is fully inserted into the opening 243 such that the valve seat ring 212 slidably engages around an outer circumferential surface 233S of the base portion 233. The diameter of the base portion 233 is larger than the diameters of the transitional portion 234 and neck portion 235 such that a partial thickness of the valve seat ring 212 extends beyond the valve seat portion 210 and spacer 214 to sealably engage the bore 108 to direct fluid flow through the channel 231 and not along the outer surfaces 230C and 246 of the valve seat portion 210 and spacer 214, respectively. In other words, in this configuration, the valve seat spacer 212 has a larger overall diameter than the valve seat portion 210 and the spacer 214. This configuration, an installed configuration, is also shown in FIG. 8, and allows the valve member 216 to prevent or allow fluid bypass through the channel 231.

FIG. 7 illustrates an embodiment of the valve member 216 and the valve spring 218. The valve member 216 is spherical and in the shape of a ball in this embodiment. However, the valve member 216 may be differently shaped to achieve a similar function, namely preventing or allowing fluid passage through the channel 231 of the valve seat apparatus 209 under certain given fluid pressure states. Such shapes include a conical or frusto-conical structure to complement the frusto-conical surface 238 of the channel 231, cylindrical structure, or a capsule structure being a cylinder with one or more hemispherical ends, i.e. a spherocylinder.

The valve spring 218, in conjunction with the valve member 216, metering fluid passage through the channel 231 of the valve seat apparatus 209. Under high pressure situations in the outflow cooler line 116, the valve member 216 is depressed into the valve spring 218 causing the valve spring to contract. The valve member 216 is moved such that it is no longer blocking fluid flow through the cavity 231. This allows fluid to pass from the outflow line 116A through the channel 231, and back through the inflow line 118A. This bypasses the cooler and sends the fluid back to the transmission. While the fluid is not cooled in this scenario, in high temperature conditions, even uncooled fluid helps to control and/or reduce temperature. Under sufficiently low pressure, the valve member 216 remains in sealed contact with the channel 231, or contacts the channel in such a way that fluid does not pass from the outflow lines to the inflow lines via the channel.

In the preferred embodiment, the valve spring 218 has opposing ends 298 and 299 with different diameters. The end 298 has a smaller diameter than the end 299, as the end 298 is sized to hold and interact with a spherical valve member 216, and to fit within the channel 231 along the second cylindrical surface 240. The end 299 is larger in diameter and sized to interact with a bottom surface 115A of the bypass channel 115. In this manner, the valve spring is compressible between the valve member 216 and the bottom surface 115A of the bypass channel 115. While the valve spring 218 has a frusto-conical shape in this embodiment, it may be differently shaped to properly cooperate with different shapes of the valve member 216 and channel 231 to meter fluid bypass flow in response to changing fluid temperature and pressure.

FIG. 10 illustrates the stabilizing spring 208 secured to the plug 204. The stabilizing spring has two opposing ends 296 and 297. The end 296 has a smaller diameter than the end 297, as the end 296 is sized to slidably engage over the inner member 224 of the plug 204 and interact with surface 220B of the body 220. The end 297 is larger and sized to interact with surface 230a of the valve seat portion 210. In this manner, the stabilizing spring 208 is compressible between the plug 204 and the valve seat portion 210 along surfaces 220B and 230A, respectively. While the stabilizing spring 208 has a frusto-conical shape in this embodiment, it may be differently shaped to properly cooperate with different shapes of the inner member 224 and valve seat portion 210 to properly stabilize the valve seat apparatus 209 within the bore 108 and against the bottom 113 of the bore.

Figure 12:
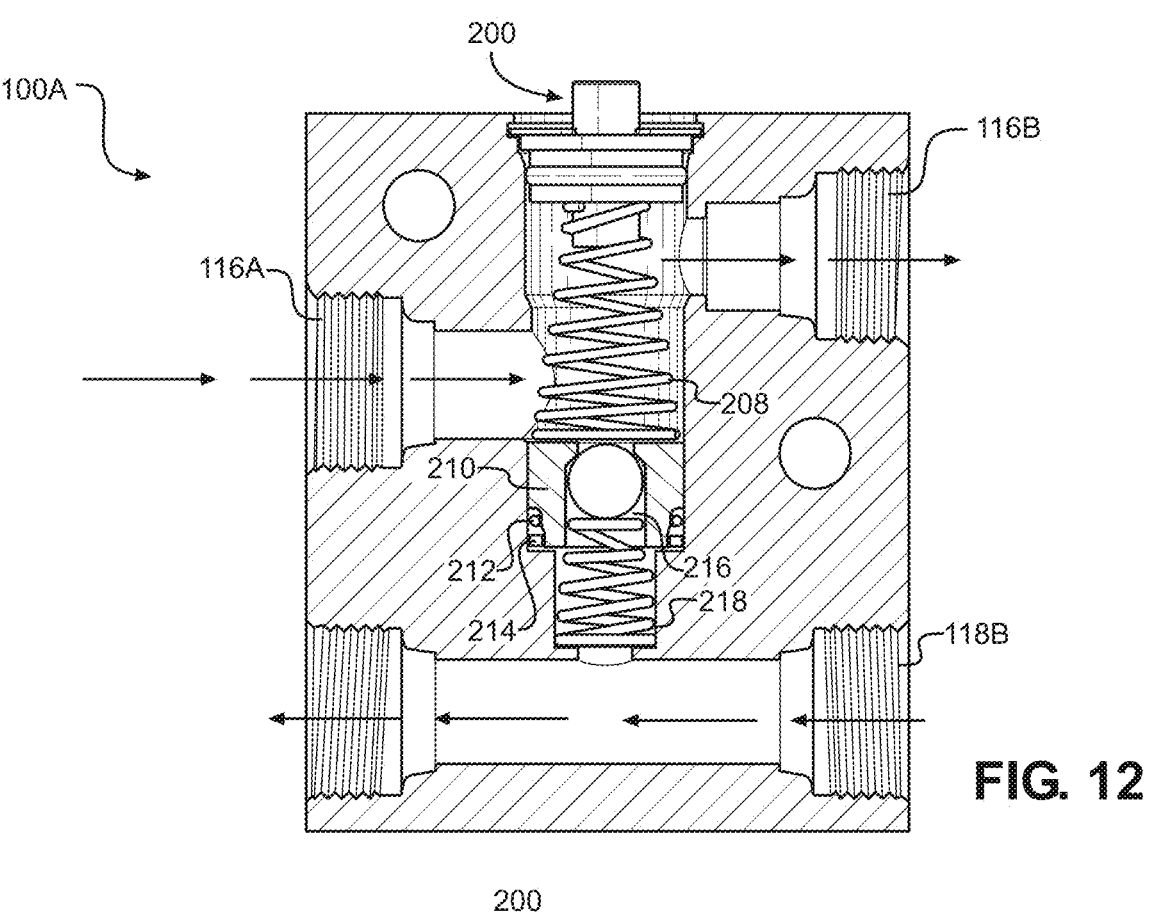
FIG. 12 is an illustration of the thermal bypass control valve embodiment of FIG. 3 installed in the bore of the cooler line block, the cooler fluid control valve in a closed configuration.
Figure 13:
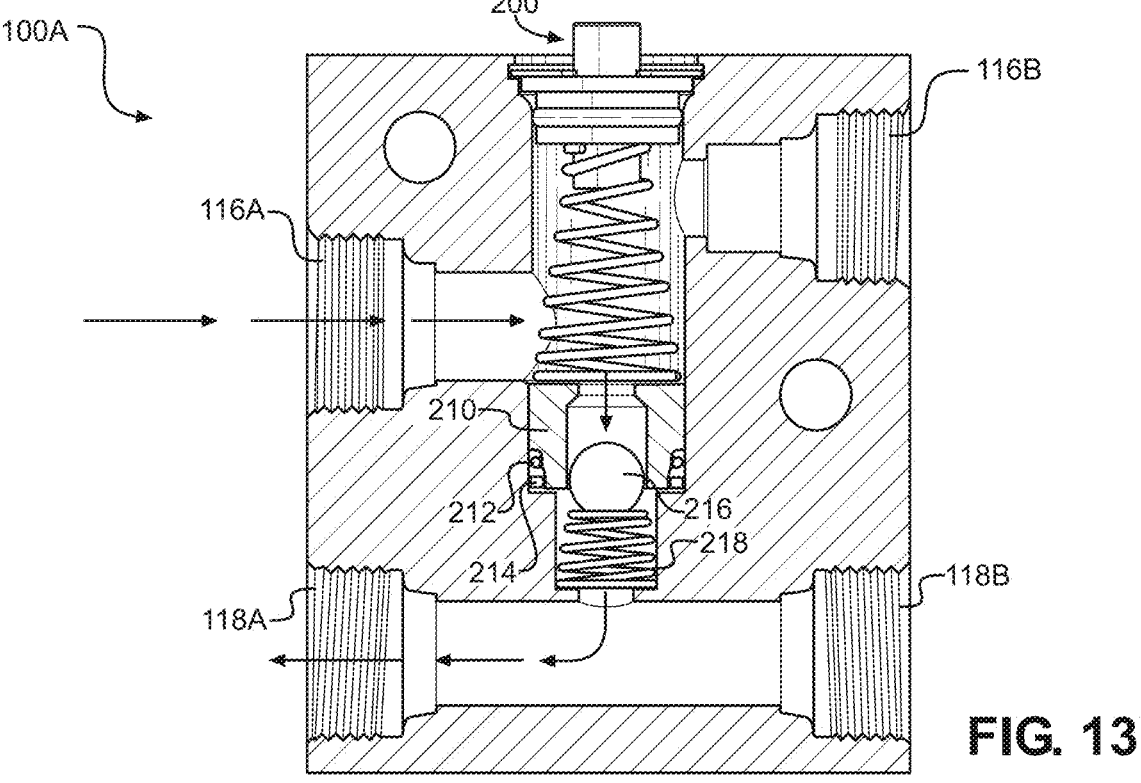
FIG. 13 is an illustration of the thermal bypass control valve embodiment of FIG. 11, the cooler fluid control valve in an open configuration.

FIG. 12 illustrates the valve 200 in a normal flow condition and FIG. 13 illustrates the valve in a bypass flow condition. In the normal flow condition fluid pressure is low enough that the valve spring 218 is not compressed by the valve member 216. The valve member 216 therefore seals the channel 231 of the valve seat apparatus 209 preventing fluid flow through the bypass opening 117. Fluid flow is therefore directed from outflow line opening 116A into the cooler line block 100a, 100b, through the bore 108 between the plug 204 and valve seat apparatus 209, through the outflow line opening 116B to the cooler, and back to the cooler line block via inflow line opening 118B, then back to the transmission via inflow line opening 118A.

Under sufficiently high fluid pressure in the bore 108, the valve member 216 is forced to compress the valve spring 218 and allow fluid flow through the channel 231, past the valve member and spring, through the bypass channel 115 and opening 117, and into the inflow line 118 back to the transmission via inflow line opening 118A. In this situation, fluid temperature in the transmission has reached a threshold that even a supply of uncooled fluid bypassing the cooler helps to alleviate fluid pressure in the system. Once temperature is reduced, and fluid pressure correspondingly reduces, to sufficient levels, the valve spring 218 expands back to press the valve element 216 into the channel 231 to seal off fluid bypass and once again direct fluid to the cooler. The tension of the valve spring 216 can be altered to change the pressure threshold at which the valve 200 switches between the closed and open configurations of FIGS. 12 and 13.

The thermal bypass control valve 200 of the present invention may also be used in a reverse flow operation, in which flow through the cooler lines and block is reversed. In this configuration, for example, fluid would flow from the transmission to the block at line opening 118A, out to the cooler at line opening 118B, back to the cooler block at line opening 116B, and out to the transmission at line opening 116A.

The valve 200 embodiment of FIG. 3 is preferably used in GM, Allison, and Ford transmissions, but may be used with any other compatible transmission.

Figure 14:
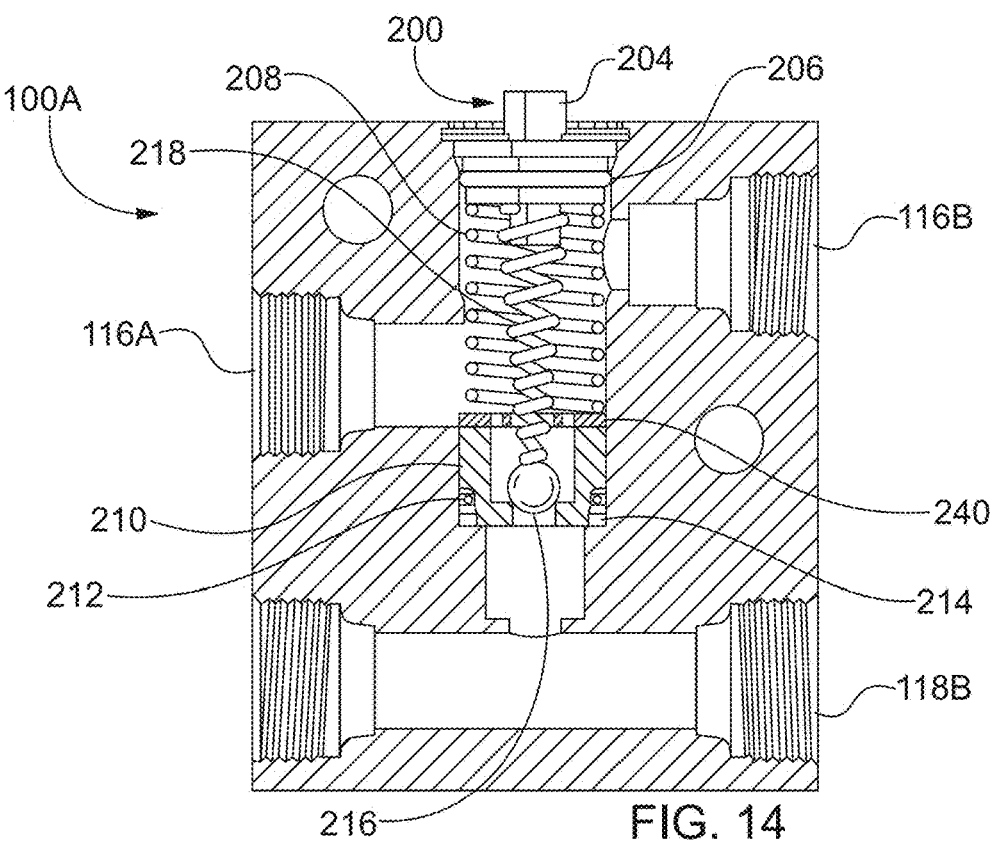
FIG. 14 is an illustration of an alternate thermal bypass control valve embodiment installed in a bore of a cooler line block, a cooler fluid control valve in a closed configuration.
Figure 15:
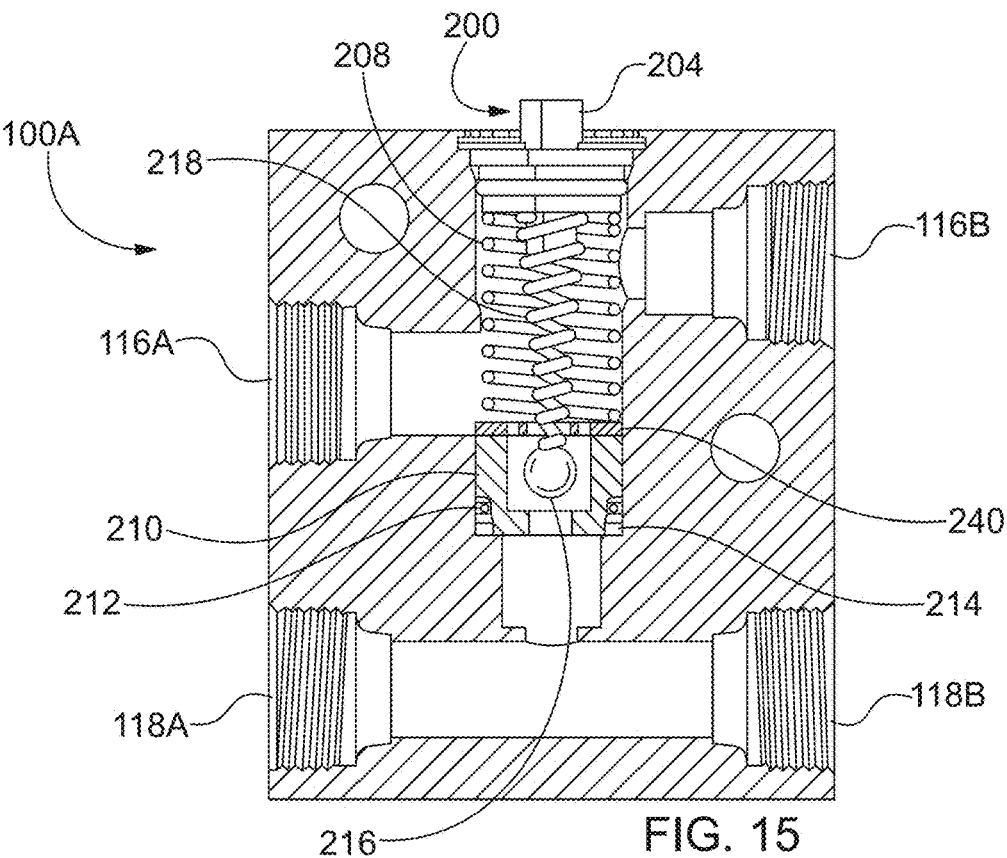
FIG. 15 is an illustration of the thermal bypass control valve embodiment of FIG. 14, the cooler fluid control valve in an open configuration.

An alternative embodiment of a thermal bypass control valve 200 is shown in FIG. 14. The thermal bypass control valve 200 includes a clip 202, a plug 204, a plug ring 206, a spring 208, a valve seat portion 210, a valve seat ring 212, a spacer 214, a valve member 216, a spring 218, and a cap 240. The clip 202, plug 204, plug ring 206, valve seat ring 212, spacer 214, and valve member 216 of the valve 200 embodiment of FIG. 14 are substantially identical to the similarly-numbered structures provided for the valve embodiment of FIG. 3.

A valve seat portion 210 of the valve embodiment of FIG. 14 is similar to the valve embodiment of FIG. 3, but shaped slightly differently to accommodate the repositioning of spring 18. In FIG. 14, the shape of the channel 231 is longitudinally flipped, such that the first cylindrical surface 236 and frusto-conical surface 238 are located at the bottom of the valve seat portion 210, adjacent to the bottom surface 210B. Likewise, the second cylindrical surface 240 is adjacent to the top surface 210A. In this configuration, the cavity 231 is narrower at a top than at a bottom. The valve member 216 still movably engages against the frusto-conical surface 238. Surface 238 may optionally be oriented perpendicularly to surfaces 240 and 236 to form a right angle. The diameter of the cavity 231 may vary to accommodate the spring 218. All other reference numbers provided in FIGS. 6A-6B, and their corresponding structures, are otherwise similar and applicable to the valve seat portion 210 of FIG. 14.

Figure 16:
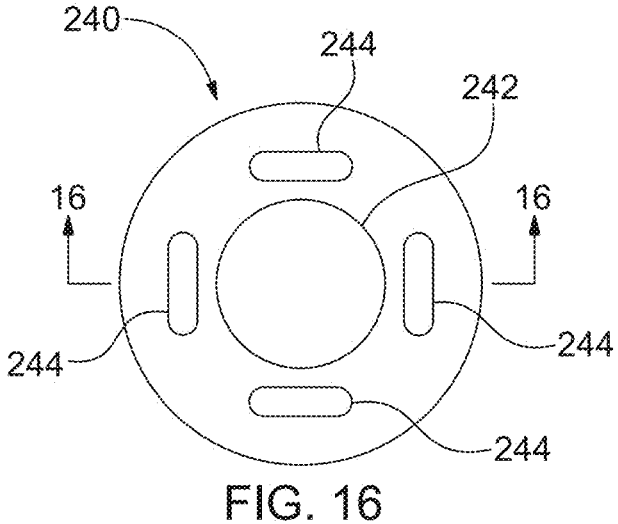
FIG. 16 is a top plan view of a cap for the cooler fluid control valve of FIG. 14.
Figure 17:
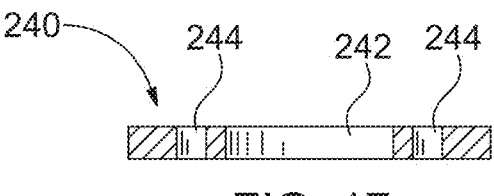
FIG. 17 is a cross-sectional view of the cap of FIG. 16.

A cap 240, shown in FIGS. 16 and 17, rests against the top surface 210A of the valve seat portion 210. A central opening 242 in the cap 240 allows the spring 218 to pass through the cap and into the channel 231. A plurality of secondary openings, or flow openings, 244 also extend through the cap and open into the channel 231. Each opening of the plurality of openings 244 preferably has a diameter of 2.1336 mm to 3.175 mm (0.084 in. to 0.175 in.), inclusive. However, other sizes are contemplated as necessary to properly calibrate fluid flow.

The spring 208 extends longitudinally between the plug 204 and the cap 240, resting against the surface 220B and a top surface of the cap, respectively. The spring 208 provides force against the cap 240 and the valve seat portion 210 to keep both of those structures secure within the bore of the cooler line block.

The spring 218, secured around the inner member 224 of the plug 204 at one end, extends downwardly from the plug, through the cap 240, partially within the cavity 231, and against the valve member 216. The spring 218 is configured to compress and expand in response to forces acting on the valve member 216. Preferably, the spring 218 is positioned inside and coaxially with the spring 208. The spring 218 is preferably calibrated for 172.369 kPa (or 25 PSI).

Once installed in the bore of the cooler block, the valve 200 embodiment of FIG. 14 is configured to constantly supply fluid from the transmission to the cooler and then back to the transmission, as provided in FIG. 14. The valve member 216 sits within the channel 231 and blocks fluid flow through the valve seat portion 210. If a blockage occurs in the cooler, fluid bypass of the cooler is possible. In the case of such a blockage, fluid pressure forces the valve member 216 to act against and compress the spring 218. This allows fluid to flow through the valve seat portion 210 via the channel 231 and out through the plurality of openings 244 in the cap 240 to bypass the cooler and return to the transmission through the appropriate cooler lines.

The valve 200 embodiment of FIG. 14 is preferably used in Chrysler, Nissan, and/or Mercedes transmissions, but may be used with any other compatible transmission.

Alternatively, the OEM cooler line block can be setup where the outflow and inflow lines 116 and 118 are swapped, in other words, fluid passes through opening 118A or 118B, into the bore 116, through the bypass channel 115, through opening 117, into the inflow channel, and out through the inflow opening 116A or 116B to travel back to the transmission.

Figure 18:
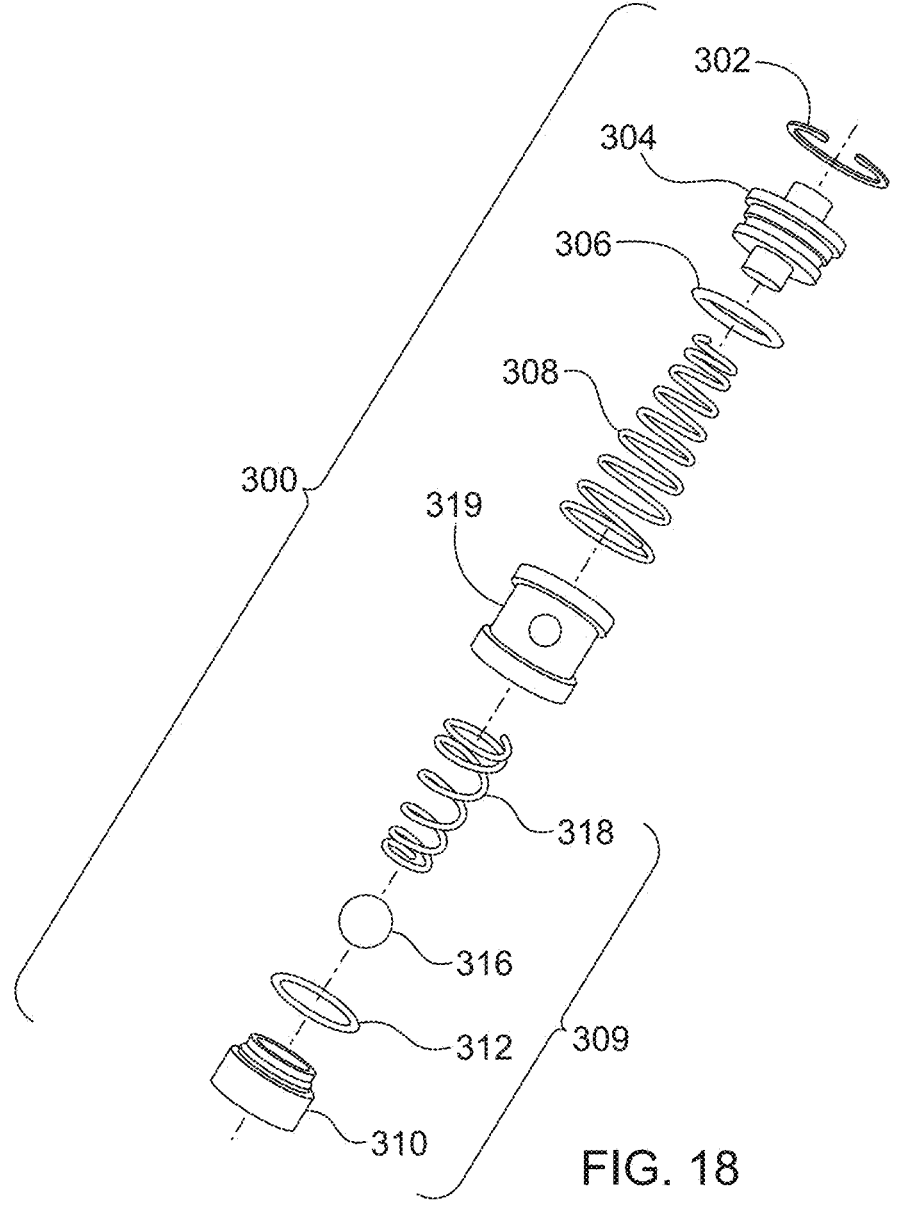
FIG. 18 is an exploded view of an alternate thermal bypass control valve embodiment according to the present invention.

FIG. 18 Illustrates an alternate embodiment of a thermal bypass control valve 300 insertable in the bore 108 of a cooler line block 100a or 100b with offset openings 118A, 118B for an inflow line. The valve 300 includes a clip 302 insertable in one of the grooves 206 of the cooler line block 100a, 100b to secure a plug 304 within the opening 104. In some embodiments, the clip 302 may be the OEM clip that is reusable with the remaining new parts, i.e. not OEM parts, of the valve 300. The plug 304 closes the opening 104 so that fluid cannot escape the bore 108 through the opening once the valve 300 is properly secured within the bore. A plug ring 306 assists in closing the opening 104 by providing a seal against the bore 108, and between the bore and the plug 304. The plug ring 306 also helps to secure the plug 304 in the opening when secured in a groove of the plug 104 by providing resistance through friction and compression of the ring between the plug and the bore 108. A valve seat apparatus 309 sits within the bore 108 along the bottom 103, and includes a valve seat portion 310, a valve seat ring 312, and a spring seat 319. The valve seat ring 312 helps to secure the valve seat apparatus 309 in the bore 108 by providing resistance through friction and compression of the ring between the valve seat portion 210 and the bore. A stabilizing spring 308 extends along a partial length of the bore 108 and between the plug 304 and the spring seat 319 to hold the valve seat apparatus 309 against the bottom 113 of the bore 108. A valve member 316 and a valve spring 318 are positioned within a cavity created by the combination of spring seat 319 and valve seat 310. The valve spring 318 preferably extends within the bypass opening 115 and movably secures the valve member 316 between the valve seat and spring seat.

Figure 19A:
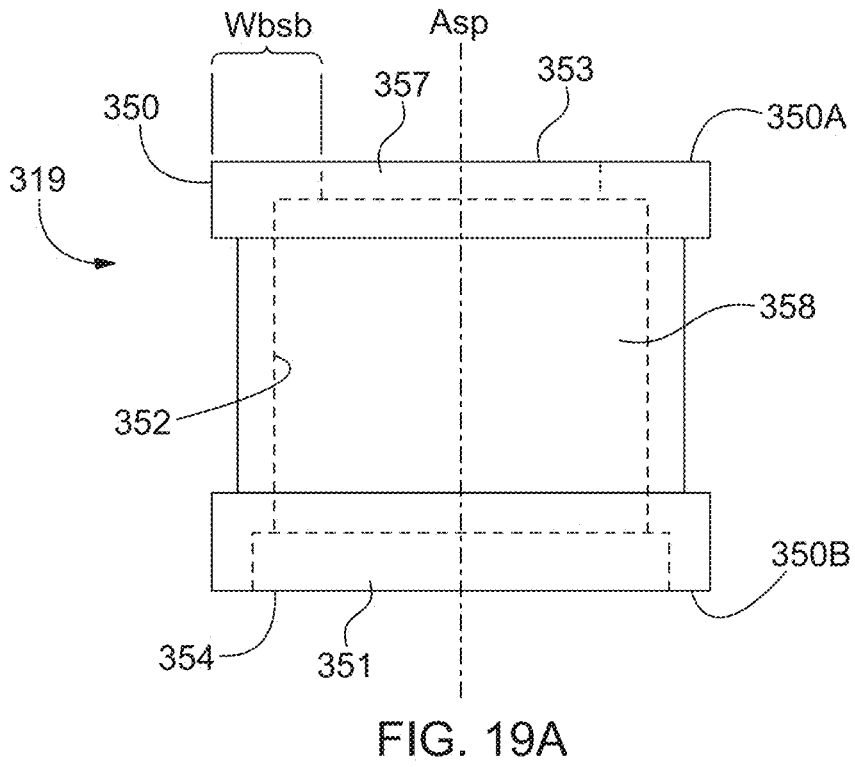
FIG. 19A is a side view of a spring seat portion of the thermal bypass control valve embodiment of FIG. 18, with internal structures shown in dashed lines.
Figure 19B:
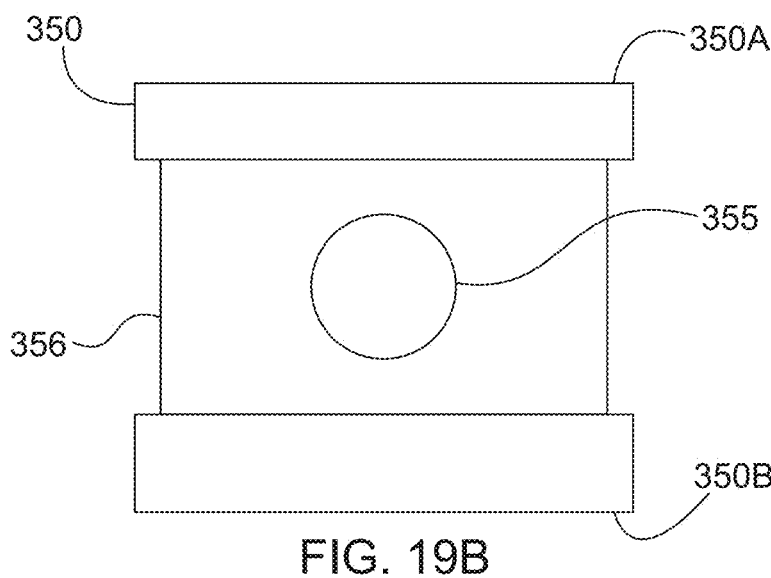
FIG. 19B is the side view of the spring seat portion of FIG. 19A showing an outer surface and no dashed lines indicating internal structures.

FIGS. 19A and 19B illustrate the spring seat portion 319, which is assembled with the valve seat 310 and valve ring 312 to form the valve seat apparatus 309. The spring seat portion 319 includes a cylindrical spring seat body 350 and a receiving element 351 which retracts into the spring seat body from bottom surface 350B of the spring seat body. A top surface 350A of the spring seat body 350 has a width Wbsb to accommodate a wide end 397 of the stabilizing spring 308 when the valve 300 is positioned within the bore 108. Preferably, the width Wbsb is 0.164"+/−0.0005" (4.166 mm+/−0.013 mm).

The receiving element 351 retracts from the bottom surface 350B into central cylindrical surface 352 which runs centrally through the spring seat 319 into a top cylindrical surface 357 and is open at openings 353 and 354 along top surface 350A and bottom surface 350B, respectively, as well as perpendicularly having the plurality of openings 355 on the inset portion 356 of the spring seat body 350.

Preferred dimensions of the spring seat portion 319 will be described next, with length dimensions being oriented along, or parallel to, the spring seat axis $A_{sp}$ and the diameter dimensions being oriented perpendicularly to the spring seat axis $A_{sp}$. The body 350 preferably has a 1st length of 0.100"+/−0.001" (2.54 mm+/−0.025 mm) and a diameter of 0.648"+/−0.001" (16.459 mm+/−0.025 mm). The inset portion 356 has a preferable length of 0.332"+/−0.001" (8.433 mm+/−0.025 mm) and a diameter of 0.580"+/−0.001" (14.732 mm+/−0.025 mm). Following the inset portion 356, the body 350 preferably has a preferable 2nd length of 0.125"+/−0.001" (3.175 mm+/−0.025 mm) and a diameter of 0.648"+/−0.001" (16.459 mm+/−0.025 mm). The cavity 358, from surface 350A to 350B, has a total length of 0.557"+/−0.001" (14.148 mm+/−0.025 mm). The top cylindrical surface 357 has a length of 0.050"+/−0.001" (1.27 mm+/−0.025 mm) and a diameter of 0.360"+/−0.001" (9.144 mm+/−0.025 mm). The central cylindrical surface 352 has a length of 0.432"+/−0.001" (10.973 mm+/−0.025 mm) and a diameter of 0.480"+/−0.001" (12.192 mm+/−0.025 mm). The receiving element 351 has a length of 0.075"+/−0.001" (1.905 mm+/−0.025 mm) and a diameter of 0.537"+/−0.001" (13.64 mm+/−0.025 mm). The inset portion 356 preferably having 4 openings 255 arranged perpendicularly to the spring seat axis Asp with diameters of 0.187"+/−0.001" (4.763 mm+/−0.025 mm).

The spring seat body 350 and cavity 358 are preferably oriented coaxially along the spring seat axis $A_{sp}$, along with their respective substructures, such as inset portion 356, the top cylindrical surface 357, the central cylindrical surface 352, and receiving element 351.

Figure 20:
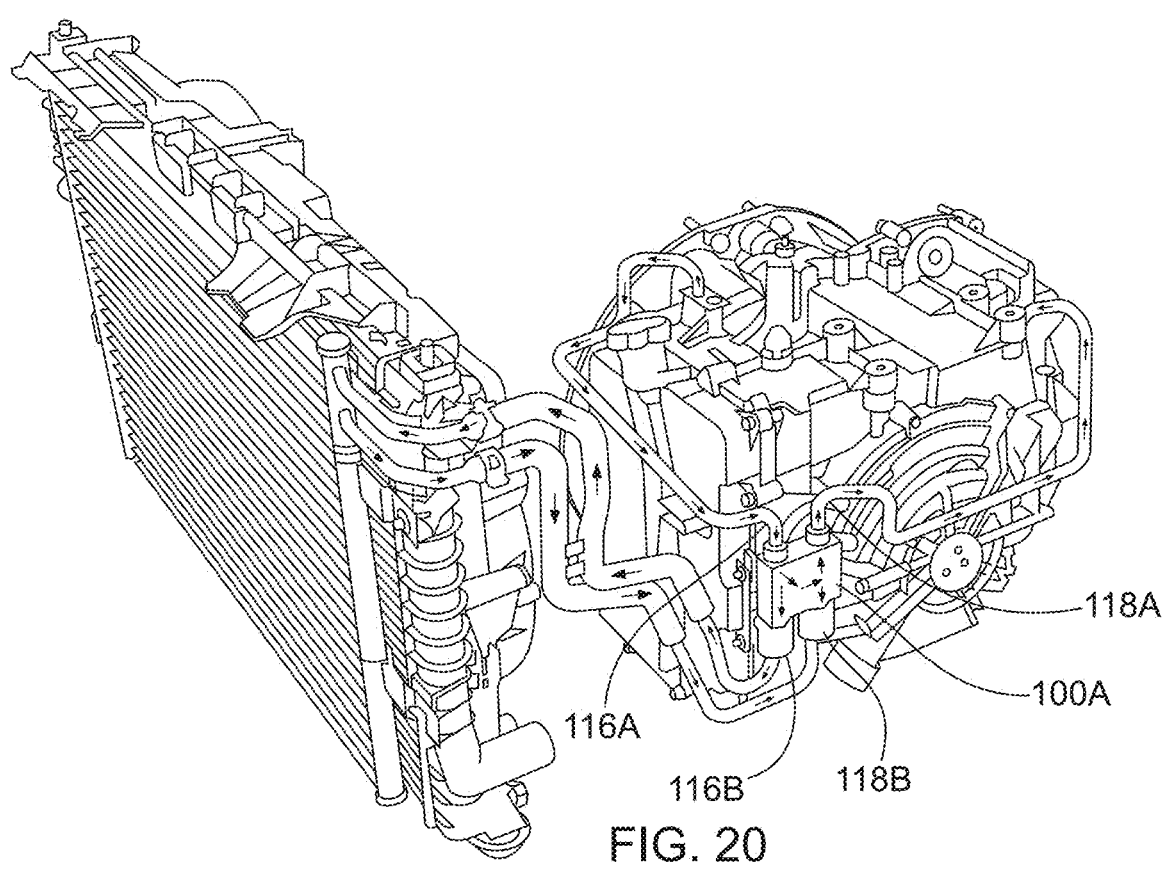
FIG. 20 is a representation of a cooler line block associated with the thermal bypass control valve of FIG. 18 installed along a transmission.

FIG. 20 shows the cooler block, 100A for illustrative purposes, but could be 100B installed in a representative transmission. In the valve embodiment 300, the cooler lines 116, 118 are reversed compared to the valve 200 embodiment, as is the orientation of the valve member 316 and valve spring 318 are opposite to the orientation of the valve member 216 and valve spring 218, and the orientation of the valve seat portion 310 versus valve seat portion 210.

Figure 21:
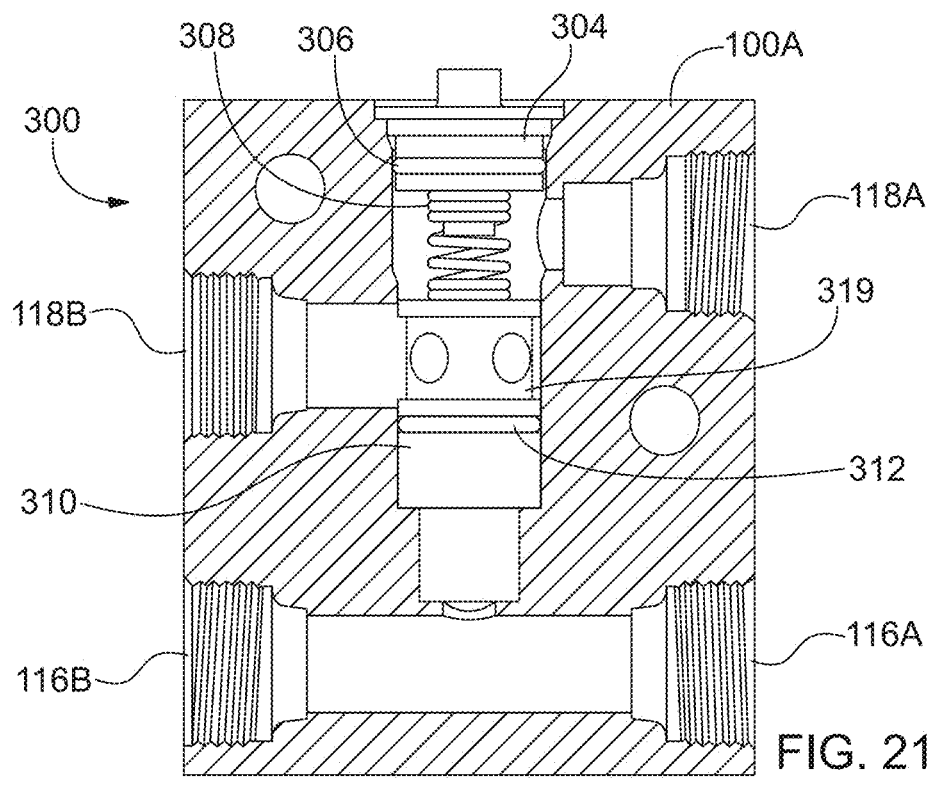
FIG. 21 is a cross-sectional view of the cooler line block of FIG. 20 with the thermal bypass control valve of FIG. 18, not shown in a cross-sectional view, installed in the cooler line block.

As opposed to the valve 200 embodiment, the valve 300 is secured in a cooler line block 100A with the transmission-side lines 116A, 118A on the right side of the block and the cooler-side lines 116B, 118B on the left side of the block, which is again opposite to the valve 200 embodiment. This orientation is shown in FIG. 21 and opposite to the configuration shown in FIGS. 4A-4B. Further, the transmission to cooler lines 116A, 116B are on the bottom of the block 100A and the cooler to transmission lines 118A, 118B are on the top of the block, again opposite to the configuration shown in FIGS. 4A-4B.

Figure 22:
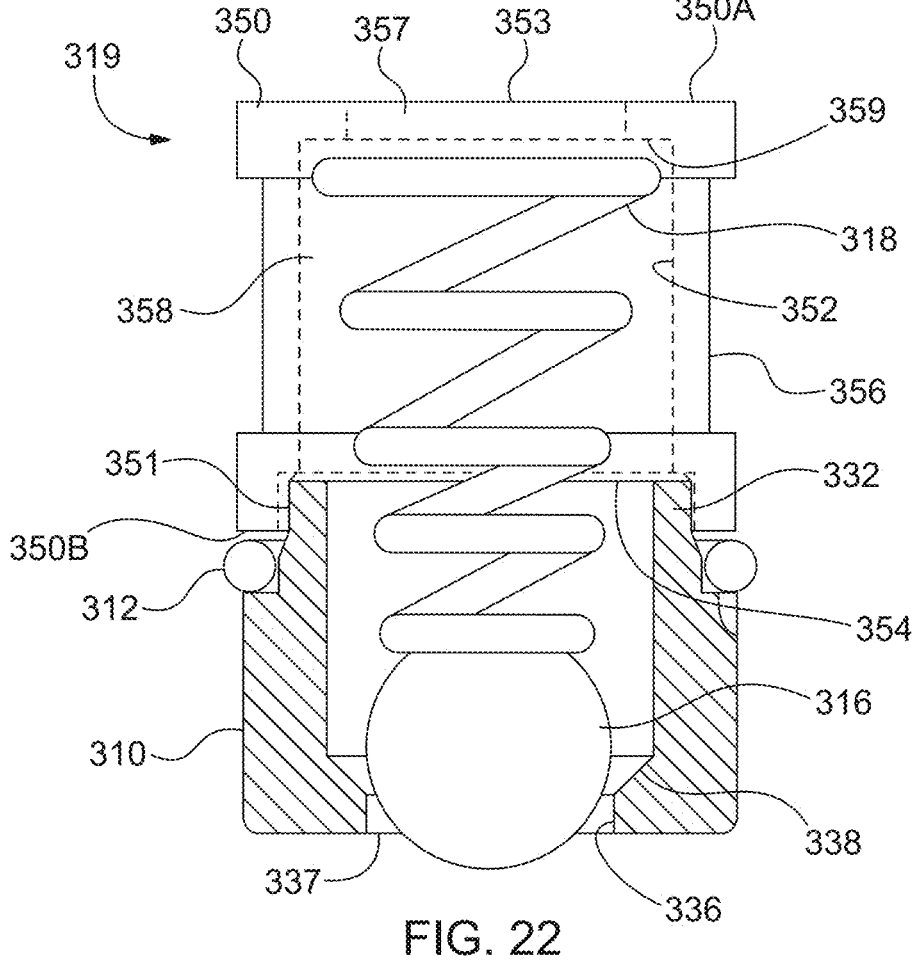
FIG. 22 is a cross-sectional view of the spring seat portion and a valve seat portion secured together, and showing a valve member and a valve spring operably positioned within the thermal bypass control valve when installed as in FIG. 21.

As shown in FIG. 22, the valve seat body 310 is insertable into receiving element 351 with valve seat ring 312 providing a friction coefficient to help secure the valve seat 310 and spring seat 319 in the bore 108. The valve seat body 310 includes an insertable element 332, which may be similar to valve seat body 210 and insertable element 232, oriented towards and inserted through opening 354 and secured within and between receiving element 351. The spring 318 is secured between surface 359 of the spring seat portion 319 and the valve member 316, which is movable within the valve seat portion 310, and the bore 108, when secured in the cooler block 100. In the valve 300 embodiment, upward force on the valve member 316, in the form of fluid pressure, forces the valve spring 318 to compress, whereas downward pressure on the valve member 216 in the valve 200 embodiment causes compression of the valve spring 218. Again, this is due to the reversal of fluid flow through the cooler lines 116, 118, the block 100A, and valve 300, compared to the embodiment of valve 200.

When fluid pressure is low enough that the valve spring 318 is not forced to compress, the expansion forces of the spring 318 force the valve member 316 against an inner surface 336 of an opening 337 in the valve seat 310, which may also include a sloped surface 338, as similar to the valve seat 210 in the valve 200.

Figure 23A:
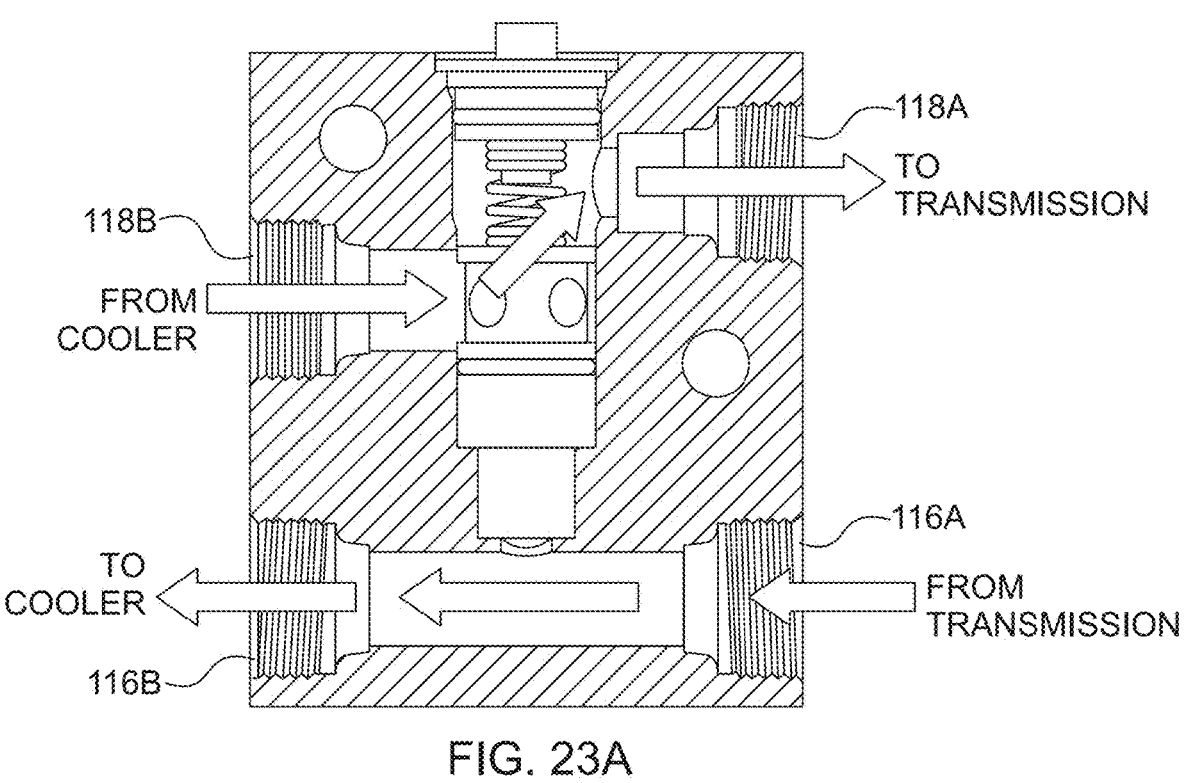
FIG. 23A shows the cross-sectional view of FIG. 21 along with a representation of cooler fluid flow through the cooler block when the thermal bypass control valve is in a closed state.
Figure 23B:
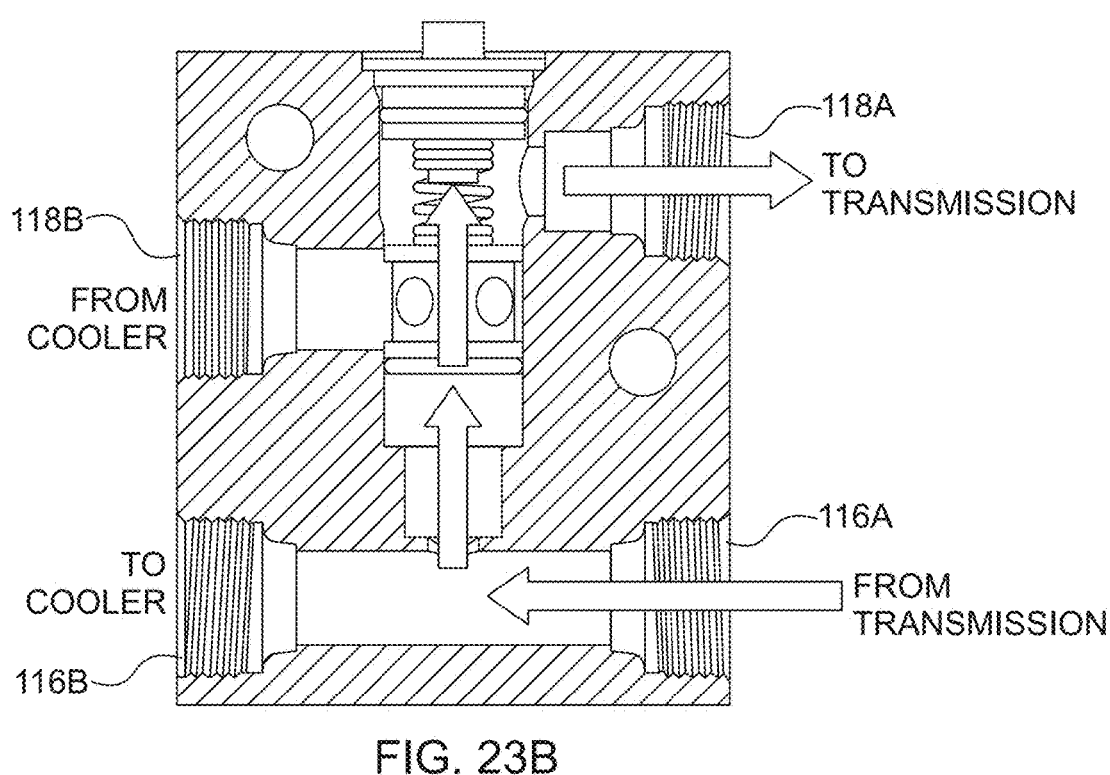
FIG. 23B shows the cross-sectional view of FIG. 21 along with a representation of cooler fluid flow through the cooler block when the thermal bypass control valve is in an open state.

The reversal of the direction of fluid flow due to reorganization of sub-structures of the valve 300 is shown in FIGS. 23A and 23B. With the transmission-to-cooler line now being along the bottom of the block 100A, it causes the fluid to push the valve member, or ball, 316 up into the valve seat portion on the STL020 design when in cooler bypass function. Fluid pressure also now acts on the valve seat portion 310 diameter and valve member 316 instead of only on the valve member 316 creating the larger area for the fluid pressure to act on. When enough pressure has built up due to high cooler fluid heat, the valve member 316 raises up and the fluid flow bypasses the cooler via 116B/118B and travels through the valve 300 to return to the transmission via line 118A.

In normal flow from transmission to the cooler and back to the transmission, the cooler liquid passes through the openings 355 perpendicular to the spring seat axis $A_{sp}$ which is the routed through the opening 353 in the top of the spring seat portion 319 to the return to transmission circuit via 118A.

Figure 24A:
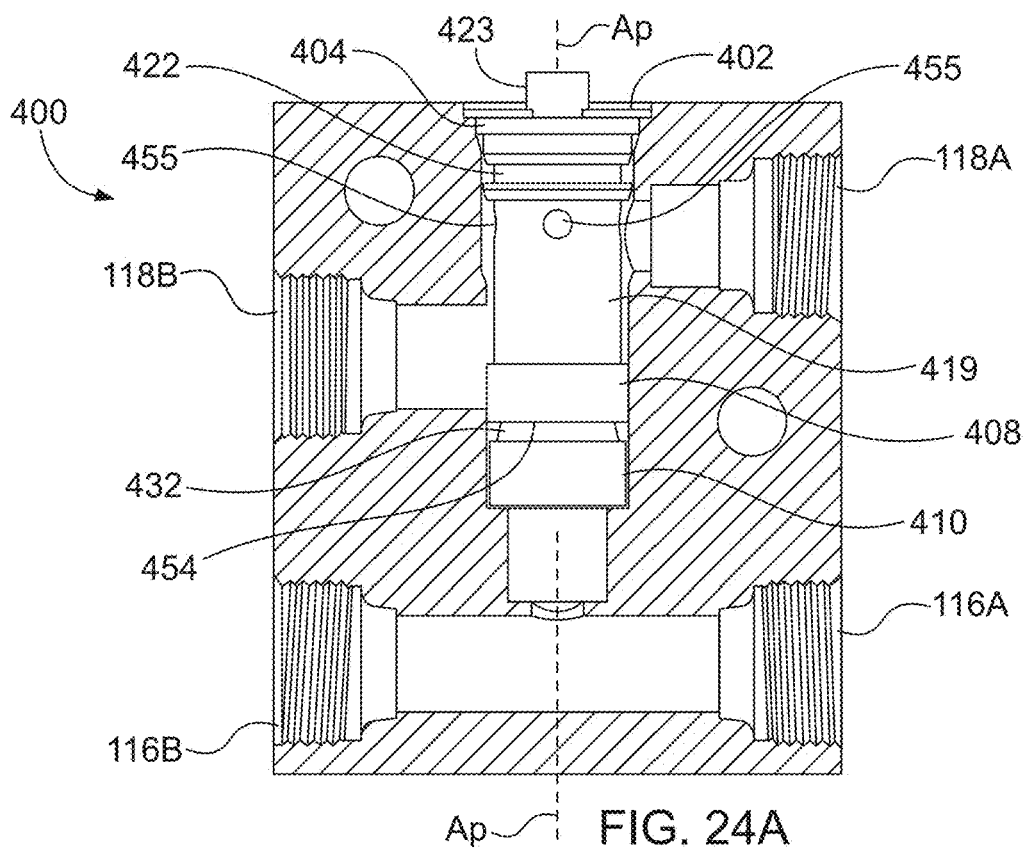
FIG. 24A shows an alternate thermal bypass control valve embodiment inserted in a cross-sectional view of an OEM cooler block.

FIG. 24A shows an alternate thermal bypass control valve embodiment 400 inserted in a cross-sectional view of an OEM cooler block. This embodiment of the valve 400 combines the plug 304 and spring seat 319 of the valve embodiment 300 into a single piece. By combining the plug 304 and spring seat 319 into valve body 419, the stabilizing spring 308 is not necessary and has no equivalent in the valve embodiment 400.

The valve 400 includes the valve body 419, a valve seat 410, a valve spring 418, a valve member 416, a valve body seal 406, a valve seat seal 412, and the OEM valve clip 402.

The valve body 419 is generally cylindrical with a closed end being a plug 404 and having a member 423 extending from the closed end. The plug 404 has a wider diameter than the rest of the valve body 419, as in other embodiments, to help prevent fluid escape from the bore when the valve 400 is inserted into the bore. The valve body seal 406, being an O-ring, is insertable into a seal groove 422 to additionally prevent fluid escape from the bore when the valve 400 is inserted into the bore. There are multiple holes 455 in the valve body 419 to allow fluid flow from inside the valve body 419 to outside the valve body, and vice versa. Preferably, there are four holes 455 in the valve body 419.

Figure 24B:
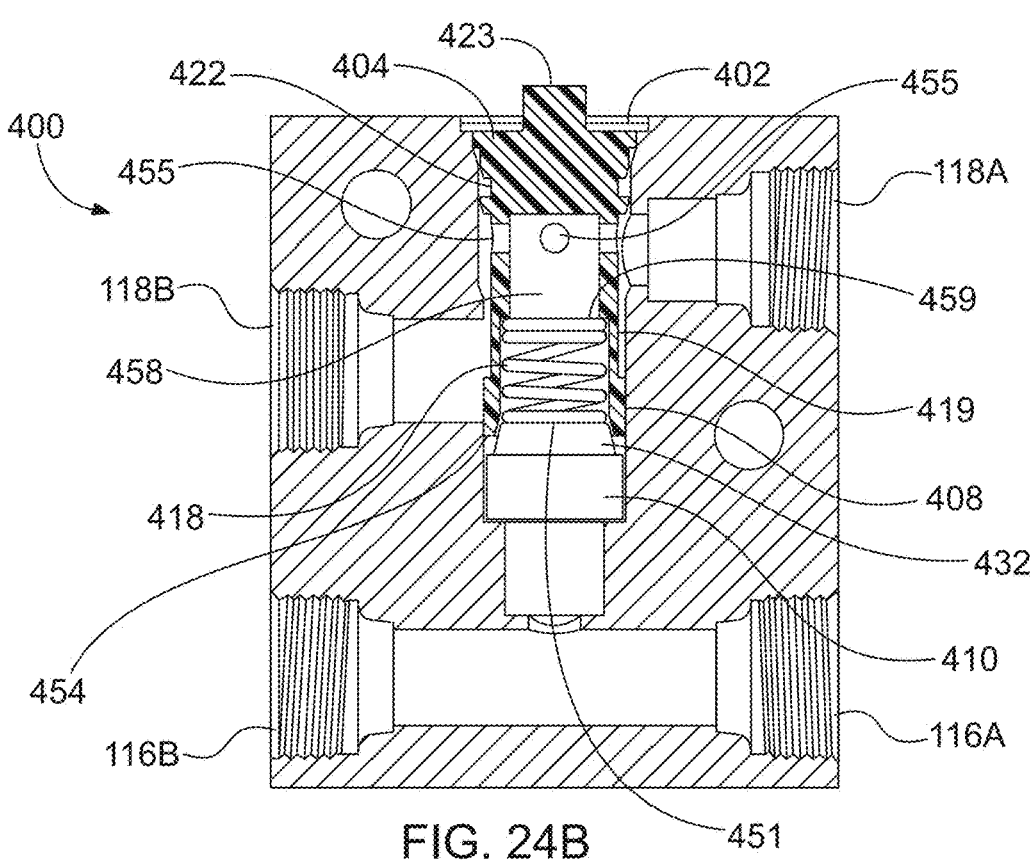
FIG. 24B shows a cross-sectional view of the thermal bypass control valve embodiment of FIG. 24A inserted in a cross-sectional view of an OEM cooler block.

Opposite to the closed end being a plug 404, the valve body 419 has an oppositely oriented open end having an opening 454 into an inner channel 458, as shown in FIG. 24B. A receiving element 451 is positioned in the inner channel 458 adjacent to the opening 454. The receiving element is a narrowed portion of the inner channel 458 that is shaped to receive and secure the valve seat 410 within the opening 454 of the valve body 419. The receiving element 451 may include a surface that is created by a narrowed section of the inner channel 458 creating a circumferential surface along a plane that is perpendicular to a longitudinal axis $A_p$. The inner channel 458 further includes a surface 459 that secures the valve spring 418 between the surface 459 and the valve member 416 when the valve 400 is assembled in the bore. The surface 459 can be created by a narrowed section of the inner channel 458 creating a circumferential surface along a plane that is perpendicular to a longitudinal axis $A_p$.

The valve seat 410, the valve spring 418, and the valve member 416 are preferably identical to the valve seat 310, the valve spring 318, and the valve member 316 from the valve 300 embodiment. Instead of being received in the spring seat 319, the valve seat 410 is received in the receiving element 451 of the valve body 419. The valve seat seal 412 is similarly positioned between a bottom surface of the valve body 419 and the valve seat 410. Likewise, the valve spring 418 is positioned partially within the valve body 419 and partially within the valve seat 410 between the surface 459 and the valve member 416.

The reversal of fluid flow as shown in FIGS. 23A and 23B for valve 300 is also applicable to valve 400, and opposite to the fluid flow compared to valve 200 shown in FIGS. 3-13. The valve 400 is secured in a cooler line block 100A with the transmission-side lines 116A, 118A on the right side of the block and the cooler-side lines 116B, 118B on the left side of the block, which is again opposite to the valve 200 embodiment. This orientation is shown in FIGS. 24A-24B and opposite to the configuration shown in FIGS. 4A-4B. Further, the transmission to cooler lines 116A, 116B are on the bottom of the block 100A and the cooler to transmission lines 118A, 118B are on the top of the block, again opposite to the configuration shown in FIGS. 4A-4B.

The valve seat body 410 is insertable into receiving element 451 with valve seat ring 412 providing a friction coefficient to help secure the valve seat 410 and valve body 419 in the bore 108. The valve seat body 410 includes an insertable element 432, which may be similar to valve seat body 310 and insertable element 332, oriented towards and inserted through opening 454 and secured within and between receiving element 451. The valve spring 418 is secured between surface 459 of the valve body 419 and the valve member 416, which is movable within the valve seat portion 410, and the bore 108, when secured in the cooler block 100. In the valve 400 embodiment, upward force on the valve member 416, in the form of fluid pressure, forces the valve spring 418 to compress, whereas downward pressure on the valve member 216 in the valve 200 embodiment causes compression of the valve spring 218. Again, this is due to the reversal of fluid flow through the cooler lines 116, 118, the block 100A, and valve 400, compared to the embodiment of valve 200.

When fluid pressure is low enough that the valve spring 418 is not forced to compress, the expansion forces of the spring 418 force the valve member 416 against an inner surface 436 of an opening 437, shown in FIG. 22 as 336 and 337, respectively, in the valve seat 410, which may also include a sloped surface 438, 338, as similar to the valve seat 210 in the valve 200.

The reversal of the direction of fluid flow due to reorganization of sub-structures of the valve 400 is identical to the fluid flow shown in FIGS. 23A and 23B. With the transmission-to-cooler line now being along the bottom of the block 100A, it causes the fluid to push the valve member, or ball, 416 up into the valve seat portion 410 when in cooler bypass function. Fluid pressure also now acts on the valve seat portion 410 diameter and valve member 416 instead of only on the valve member 416 creating the larger area for the fluid pressure to act on. When enough pressure has built up due to high cooler fluid heat, the valve member 416 raises up and the fluid flow bypasses the cooler via 116B/118B and travels through the valve 300 to return to the transmission via line 118A.

In normal flow from transmission to the cooler and back to the transmission, the cooler liquid passes through the openings 455 perpendicular to the spring seat axis $A_{sp}$ on into the inner channel 458 and back out through another opening 455, and/or around an outer surface of the valve body 419 and through channel 118A.

When installing the valve 400 into a transmission, the OEM valve is first removed from the bore 108. Preferably, the valve 400 is inserted together into the bore 108, with the valve member 416 and valve spring 418 positioned within the valve seat 410, and the valve body 419 secured over the valve seat 410. The valve seat 410 is inserted first and against the bottom 113 of the bore 108, and the valve 400 is secured in the bore 108 by securing the pin 402, OEM or new, against the opening of the bore 108.

Alternatively, the valve 400 may be inserted in the bore 108 component-by-component. The valve seat 410 can be inserted first, with the valve seat seal 412 secured to the valve seat 410. The valve member 416 is then inserted into the valve seat 410. The valve spring 418 is then inserted with the narrow diameter end toward and into contact with the valve member 416. The valve body 419 is then inserted in the bore 108 over the valve spring 418 and the valve seat 410 such that the larger diameter end of the spring 418 contacts and is secured against surface 459 and the valve seat seal 412 is secured between the valve body 419, valve seat 410, and the bore 108. The valve body seal 406 is inserted into groove 422 before insertion of the valve body 419 into the bore. The pin 402, OEM or new, is then secured to the bore 108 outside of the plug 404 to secure the valve 400 within the bore.

Alternatively, the valve spring 418 may be inserted into the valve body 419 first and then both components may be inserted together to achieve the same orientation in the bore 108 as the original method of installing the valve 400.

Figure 25A:
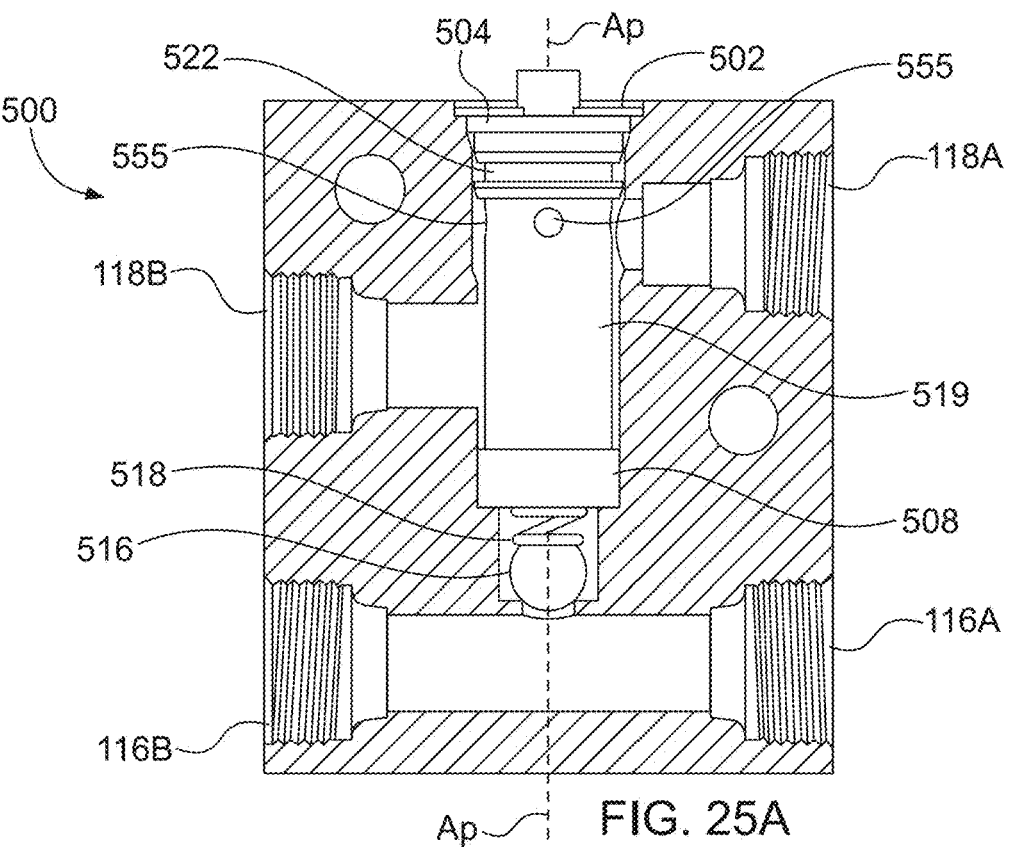
FIG. 25A shows an alternate thermal bypass control valve embodiment inserted in a cross-sectional view of an OEM cooler block.
Figure 25B:
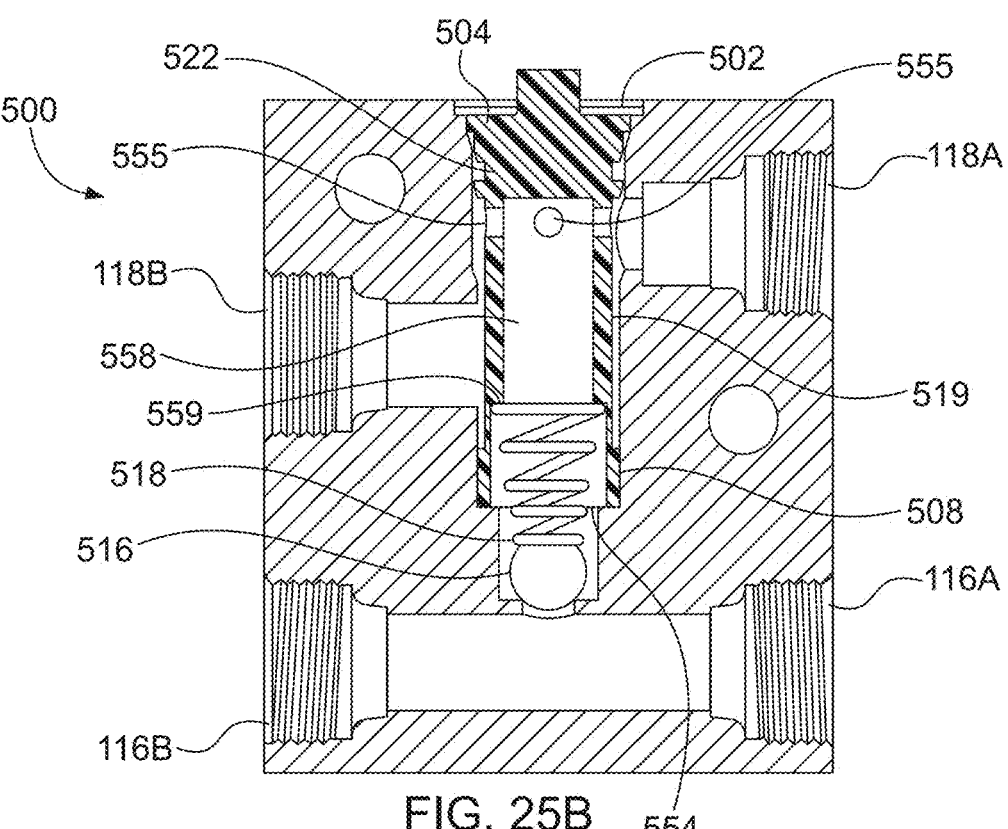
FIG. 25B shows a cross-sectional view of the thermal bypass control valve embodiment of FIG. 25A inserted in a cross-sectional view of an OEM cooler block.

FIGS. 25A-25B show another alternate thermal bypass control valve embodiment 500 utilizing the reverse fluid flow as shown in the embodiments of FIGS. 14-24B inserted in a cross-sectional view of an OEM cooler block.

The valve 500 includes the valve body 519, a valve spring 518, a valve member 516, a valve body seal 506, and the OEM valve clip 402.

The valve body 519 is generally cylindrical with a closed end being a plug 504 and having a member 523 extending from the closed end. The plug 504 has a wider diameter than the rest of the valve body 519, as in other embodiments, to help prevent fluid escape from the bore when the valve 500 is inserted into the bore. The valve body seal 506, being an O-ring, is insertable into a seal groove 522 to additionally prevent fluid escape from the bore when the valve 500 is inserted into the bore. There are multiple holes 555 in the valve body 519 to allow fluid flow from inside the valve body 519 to outside the valve body, and vice versa. Preferably, there are four holes 555 in the valve body 519.

Opposite to the closed end being a plug 504, the valve body 519 has an oppositely oriented open end having an opening 554 into an inner channel 558, as shown in FIG. 25B. The open end of the valve body 519 is configured to contact the bottom 113 of the bore when the valve 500 is inserted into the bore. The inner channel 458 includes a surface 559 that secures the valve spring 518 between the surface 559 and the valve member 516 when the valve 500 is assembled in the bore. The surface 559 can be created by a narrowed section of the inner channel 558 creating a circumferential surface along a plane that is perpendicular to a longitudinal axis $A_p$.

The valve spring 518 and the valve member 516 are preferably identical to the valve spring 418 and the valve member 416 from the valve 400 embodiment. The valve body 519 in this embodiment, unlike other embodiments, extends to the bottom 113 of the bore. The valve spring 518 is positioned partially within the valve body 519 and partially within the bore between the surface 559 and the valve member 516. The valve member 516 is held between the valve spring 516 and the opening 117 within the bypass channel 115.

The reversal of fluid flow as shown in FIGS. 23A and 23B for valve 300 is also applicable to valve 400, and opposite to the fluid flow compared to valve 200 shown in FIGS. 3-13.

The reversal of fluid flow as shown in FIGS. 23A and 23B for valve 300 is also applicable to valve 500, and opposite to the fluid flow compared to valve 200 shown in FIGS. 3-13. The valve 500 is secured in a cooler line block 100A with the transmission-side lines 116A, 118A on the right side of the block and the cooler-side lines 116B, 118B on the left side of the block, which is again opposite to the valve 200 embodiment. This orientation is shown in FIGS. 25A-25B and opposite to the configuration shown in FIGS. 4A-4B. Further, the transmission to cooler lines 116A, 116B are on the bottom of the block 100A and the cooler to transmission lines 118A, 118B are on the top of the block, again opposite to the configuration shown in FIGS. 4A-4B.

The valve body 519 is insertable into the bore 108 with valve body seal 506 providing a friction coefficient to help secure the valve body 519 in the bore 108. The valve body 519 includes an opening 454 oriented toward the bypass channel 115 and opening 117. The valve spring 518 is secured between surface 559 of the valve body 519 and the valve member 516, which is movable within the bypass channel 115 and opening 454, given enough force, when the valve is secured in the cooler block 100. In the valve 500 embodiment, upward force on the valve member 516, in the form of fluid pressure, forces the valve spring 518 to compress, whereas downward pressure on the valve member 216 in the valve 200 embodiment causes compression of the valve spring 218. Again, this is due to the reversal of fluid flow through the cooler lines 116, 118, the block 100A, and valve 500, compared to the embodiment of valve 200.

When fluid pressure is low enough that the valve spring 518 is not forced to compress, the expansion forces of the spring 518 force the valve member 516 against the opening 117 of the bypass channel 115.

The reversal of the direction of fluid flow due to reorganization of sub-structures of the valve 500 is identical to the fluid flow shown in FIGS. 23A and 23B. With the transmission-to-cooler line now being along the bottom of the block 100A, it causes the fluid to push the valve member, or ball, 516 up toward the valve body 519 when in cooler bypass function. When enough pressure has built up due to high cooler fluid heat, the valve member 516 raises up and the fluid flow bypasses the cooler via 116B/118B and travels through the valve 300 to return to the transmission via line 118A.

In normal flow from transmission to the cooler and back to the transmission, the cooler liquid passes through the openings 555 perpendicular to the spring seat axis $A_{sp}$ on into the inner channel 558 and back out through another opening 555, and/or around an outer surface of the valve body 519 and through channel 118A.

When installing the valve 500 into a transmission, the OEM valve is first removed from the bore 108. The valve member 516 is then inserted into the bypass channel. The valve spring 518 is then inserted into the bore with the narrower end oriented toward the valve member 516. The wider end, with respect to diameter, of the valve spring 518 is oriented upwards. The valve body 519, with the opening 554 oriented downwards, is slid down into the bore such that valve spring 518 enters the inner cavity 558 via opening 554 and is secured along surface 559. The OEM clip 502 or new clip 502, is then inserted to secure the valve body 519 in the bore 108 along the plug 504. Before insertion of the valve body 519, the valve body seal 506 is inserted in the groove 522 to fluidly seal the valve body 519 against the bore 108.

Alternatively, the valve spring 518 may be inserted into the valve body 519 first and then both components may be inserted together to achieve the same orientation in the bore 108 as the original method of installing the valve 500.

It should be understood that the thermal bypass control valve embodiments described herein may be used across various cooler blocks, including OEM part nos. 55111005AC and 68192000AA. The thermal bypass control valve 200 embodiments may also be used in cooler line blocks than have offset or in-line channels (i.e. line openings 116A/116B are shown offset, but may be in-line as with line openings 118A/118B). Further, the thermal bypass control valve 200 embodiments may be used with four channel or three channel cooler blocks.

Unless otherwise specified, the various alterations and additional embodiments of constituent parts and structures discussed in regards to one or more thermal bypass control valve 200 embodiments are interchangeable and applicable to other thermal bypass control valve embodiments, even if not explicitly stated.

We claim:

1. A thermal bypass control valve insertable into a bore of a cooler line block, comprising:

a plug having a cylindrical body, a cylindrical cap portion, an outer member, and an inner member, the body having a plug ring groove along a circumference of the body, the cap portion positioned between the outer member and the body, the inner member extending from the body in an opposite direction relative to the outer member, wherein the body, the cap portion, the outer member, and the inner member are all coaxially arranged along a central plug axis;

a plug ring insertable within the plug ring groove, wherein a thickness of the plug ring partially extends beyond the cylindrical body of the plug when inserted within the plug ring groove;

a valve seat apparatus having a valve seat portion having a cylindrical valve seat body and an insertable element extending from an end of the valve seat body, the insertable element having a base portion and a neck portion, and a cavity extending within the valve seat portion between two oppositely-oriented openings, wherein the valve seat body, insertable element, and cavity are oriented coaxially along a valve seat axis, and the neck portion has a smaller diameter than the base portion, a valve spring seat apparatus having a valve spring seat portion having a cylindrical spring seat body comprising a base portion and an inset portion, the inset portion having a smaller diameter than the base portion, a plurality of openings arranged perpendicular to the spring seat body, and a cavity comprising a receiving element from an end of the spring seat body, and a two cylindrical surfaces extending within the spring seat portion between two oppositely oriented openings, wherein the spring seat body receiving element and cylindrical surfaces are arranged coaxially along a spring seat axis, and the receiving portion has a smaller diameter than the base portion slidable over the neck portion of the valve seat insertable element;

a stabilizing spring configured to be positionable between the plug and the valve spring seat to secure the cap, the valve spring seat and the valve seat portion in a fixed position within the bore;

a valve member, and a valve spring, the valve spring securable between the valve spring seat and the valve member, wherein the valve spring extends between the valve spring seat and the valve member and movably secures the valve member against a surface of the cavity in a closed configuration, and the valve spring compresses to move the valve member away from the surface of the cavity in an open configuration.

2. A thermal bypass control valve insertable into a bore of a cooler line block, comprising:

a valve body being cylindrical and having a plug having a cylindrical body, a cylindrical cap portion, and an upper member, the cylindrical body having a plug ring groove along a circumference of the cylindrical body, the cap portion positioned between the upper member and the cylindrical body, a central cylindrical portion having a plurality of openings, a lower cylindrical portion, the central cylindrical portion positioned between the plug and the lower cylindrical portion, and an opening along a bottom surface of the valve body, the opening being adjacent to the lower cylindrical portion and fluidly connected with an inner cavity which is also fluidly connected to the plurality of openings of the central portion;

a plug ring insertable within the plug ring groove, wherein a thickness of the plug ring partially extends beyond the cylindrical body of the plug when inserted within the plug ring groove;

a valve seat having a cylindrical valve seat body and an insertable element extending from an end of the valve seat body, the insertable element having a base portion and a neck portion, and a cavity extending within the valve seat between two oppositely-oriented openings, wherein the valve seat body, insertable element, and cavity are oriented coaxially along a valve seat axis, and the neck portion has a smaller diameter than the base portion, a valve member, and a valve spring, the valve spring securable between an inner surface of the valve body and the valve member, wherein the valve spring movably secures the valve member against a surface of the cavity in a closed configuration, and the valve spring compresses to allow the valve member to move away from the surface of the cavity in an open configuration.

3. A thermal bypass control valve insertable into a bore of a cooler line block, comprising:

a valve body being cylindrical and having a plug having a cylindrical body, a cylindrical cap portion, and an upper member, the cylindrical body having a plug ring groove along a circumference of the cylindrical body, the cap portion positioned between the upper member and the cylindrical body, a central cylindrical portion having a plurality of openings, a lower cylindrical portion, the central cylindrical portion positioned between the plug and the lower cylindrical portion, and an opening along a bottom surface of the valve body, the opening being adjacent to the lower cylindrical portion and fluidly connected with an inner cavity which is also fluidly connected to the plurality of openings of the central portion;

a plug ring insertable within the plug ring groove, wherein a thickness of the plug ring partially extends beyond the cylindrical body of the plug when inserted within the plug ring groove;

a valve member, and a valve spring, the valve spring securable between an inner surface of the valve body and the valve member, wherein the valve spring movably secures the valve member against a surface of the bore in a closed configuration, and the valve spring compresses to allow the valve member to move away from the surface of the bore in an open configuration.

4. The thermal bypass control valve of claim 1, wherein the valve member is spherical.

5. The thermal bypass control valve of claim 1, further comprising a valve seat ring positionable around the insertable element of the valve seat portion.

6. The thermal bypass control valve of claim 2, wherein the valve member is spherical.

7. The thermal bypass control valve of claim 2, wherein the valve spring extends within and between the valve body and the valve seat.

8. The thermal bypass control valve of claim 2, wherein the insertable element of the valve seat is configured to be inserted into the opening along the bottom surface of the valve body.

9. The thermal bypass control valve of claim 3, wherein the valve member is spherical.

10. The thermal bypass control valve of claim 3, wherein the valve spring extends beyond valve body.

11. The thermal bypass control valve of claim 3, wherein the lower cylindrical portion of the valve body is configured to contact a bottom surface of the bore.

* * * * *